United States Patent [19]
Hirschmann et al.

[11] Patent Number: 6,056,894
[45] Date of Patent: May 2, 2000

[54] TN AND STN LIQUID-CRYSTAL DISPLAY

[75] Inventors: Harald Hirschmann; Clarissa Weller, both of Darmstadt; Volker Reiffenrath, Rossdorf, all of Germany

[73] Assignee: Merck Patent GmbH

[21] Appl. No.: 09/030,921

[22] Filed: Feb. 26, 1998

[30] Foreign Application Priority Data

Feb. 27, 1997 [DE] Germany .............. 197 07 956

[51] Int. Cl.⁷ .................. C09K 19/30; C09K 19/34; C09K 19/12; C09K 19/02; G02F 1/1333
[52] U.S. Cl. ................ 252/299.63; 252/299.61; 252/299.66; 252/299.67; 349/179; 349/182
[58] Field of Search .............. 252/299.67, 299.66, 252/299.63, 299.61, 299.6; 349/179, 182

[56] References Cited

U.S. PATENT DOCUMENTS

| | | | |
|---|---|---|---|
| 5,373,374 | 12/1994 | Weber et al. .................. | 252/299.63 |
| 5,618,466 | 4/1997 | Tomi et al. .................... | 252/299.63 |
| 5,779,933 | 7/1998 | Terashima et al. ............. | 252/299.1 |
| 5,837,161 | 11/1998 | Sekiguchi et al. ............. | 252/299.61 |
| 5,840,208 | 11/1998 | Yamaguchi et al. ........... | 252/299.63 |
| 5,965,060 | 10/1999 | Tarumi et al. .................. | 252/299.63 |
| 5,976,404 | 11/1999 | Hirschmann et al. .......... | 252/299.01 |
| 5,993,691 | 11/1999 | Pausch et al. ................. | 252/299.63 |
| 5,993,692 | 11/1999 | Tarumi et al. .................. | 252/299.63 |

*Primary Examiner*—C. H. Kelly
*Attorney, Agent, or Firm*—Millen, White, Zelano and Branigan

[57] ABSTRACT

TN liquid-crystal displays and supertwist liquid-crystal displays (SLCDs) having very short response times and good steepnesses and angle dependencies are obtained by using nematic liquid-crystal mixtures which comprise at least one compound of formula IA

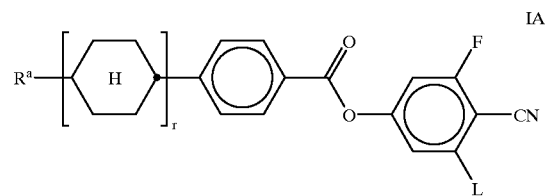

and at least one compound of the formula IB

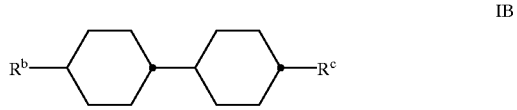

in which
$R^a$, $R^b$, $R^c$, L and r are as defined herein.

17 Claims, No Drawings

TN AND STN LIQUID-CRYSTAL DISPLAY

The invention relates to TN liquid-crystal displays and supertwist liquid-crystal displays (SLCDs) having very short response times and good steepnesses and angle dependencies, and to the nematic liquid-crystal mixtures according to the invention used therein.

SLCDs as defined in the preamble are known, for example from EP 0 131 216 B1; DE 34 23 993 A1; EP 0 098 070 A2; M. Schadt and F. Leenhouts, 17th Freiburg Congress on Liquid Crystals (8.-10.04.87); K. Kawasaki et al., SID 87 Digest 391 (20.6); M. Schadt and F. Leenhouts, SID 87 Digest 372 (20.1); K. Katoh et al., Japanese Journal of Applied Physics, Vol. 26, No. 11, L 1784-L 1786 (1987); F. Leenhouts et al., Appl. Phys. Lett. 50 (21), 1468 (1987); H. A. van Sprang and H. G. Koopman, J. Appl. Phys. 62 (5), 1734 (1987); T. J. Scheffer and J. Nehring, Appl. Phys. Lett. 45 (10), 1021 (1984), M. Schadt and F. Leenhouts, Appl. Phys. Lett. 50 (5), 236 (1987) and E. P. Raynes, Mol. Cryst. Liq. Cryst. Letters Vol. 4 (1), pp. 1–8 (1986). The term SLCD here covers any more highly twisted display element with a value for the twist angle of between 160° and 360°, such as, for example, the display elements of Waters et al. (C. M. Waters et al., Proc. Soc. Inf. Disp. (New York) (1985) (3rd Intern. Display Conference, Kobe, Japan), STN-LCDs (DE-A 35 03 259), SBE-LCDs (T. J. Scheffer and J. Nehring, Appl. Phys. Lett. 45 (1984) 1021), OMI-LCDs (M. Schadt and F. Leenhouts, Appl. Phys. Lett. 50 (1987), 236, DST-LCDs (EP-A 0 246 842) or BW-STN-LCDs (K. Kawasaki et al., SID 87 Digest 391 (20.6)).

SLCDs of this type are distinguished, in comparison to standard TN displays, by significantly better steepnesses of the electrooptical characteristic line and consequently better contrast values, and by significantly less angle dependence of the contrast. Of particular interest are SLCDs having very short response times, in particular also at relatively low temperatures. In order to achieve short response times, the viscosities, in particular, of the liquid-crystal mixtures were hitherto optimized using usually monotropic additives having relatively high vapour pressure. However, the response times achieved were not adequate for all applications.

In order to achieve a steep electrooptical characteristic line in SLCDs, the liquid-crystal mixtures should have relatively large values for $K_3/K_1$ and relatively small values for $\Delta\epsilon/\epsilon_\perp$.

In addition to optimization of the contrast and the response times, further important requirements are made of mixtures of this type:

1. A broad d/p window
2. High long-term chemical stability
3. High electrical resistance
4. Low frequency dependence of the threshold voltage.

The parameter combinations achieved are still far from adequate, in particular for high-multiplex STNs (1/400). This is in some cases attributable to the fact that the various requirements are affected in opposite manners by material parameters.

There thus continues to be a great demand for TN and STN displays, in particular for high-resolution displays (XGA), having very short response times and at the same time a large operating temperature range, high characteristic line steepness, good angle dependence of the contrast and low threshold voltage which meet the abovementioned requirements.

An object of the invention is to provide liquid-crystal displays which do not have the above-mentioned disadvantages, or only do so to a lesser extent, and at the same time have very good response times and very good steepnesses.

Upon further study of the specification and appended claims, further objects and advantages of this invention will become apparent to those skilled in the art.

It has now been found that these objects can be achieved if nematic liquid-crystal mixtures are used which comprise compounds of the formula IB

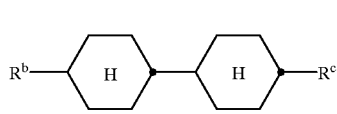

in combination with esters of the formula IA

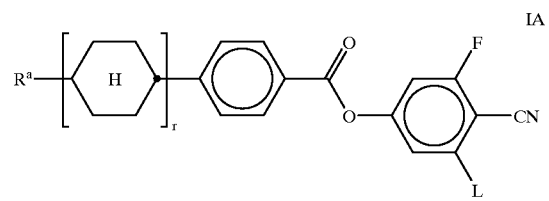

in which $R^a$ is an alkyl group having 1 to 12 carbon atoms, in which, in addition, one or two non-adjacent $CH_2$ groups may be replaced by —O—, —CH=CH—, —CO—, —OCO— or —COO—, $R^b$ and $R^c$ are each, independently of one another, an alkenyl group having 2 to 7 carbon atoms, L is H or F, and r is 0 or 1.

The use of compounds of the formulae IA and IB in TN and STN mixtures produces low viscosity and low temperature dependence of the viscosity long shelf lives in the display at low temperatures, very low S→N transitions, and very fast response times, in particular at low temperatures.

The compounds of the formulae IA and IB significantly shorten the response times of TN and STN mixtures without impairing the steepnesses.

In particular, the compounds of the formula IB produce a significant shortening of the response times while at the same time increasing the steepness, and an increase in the clearing temperatures without impairing the response times.

The invention thus relates to a liquid-crystal display containing two outer plates which, together with a frame, form a cell, a nematic liquid-crystal mixture of positive dielectric anisotropy which is present in the cell, electrode layers with alignment layers on the insides of the outer plates, a pretilt angle between the longitudinal axis of the molecules at the surface of the outer plates and the outer plates of from about 0 degree to 30 degrees, and a twist angle of the liquid-crystal mixture in the cell from alignment layer to alignment layer with a value of between 22.5° and 600°, the nematic liquid-crystal mixture comprises a) 20–90% by weight of a liquid-crystalline component A consisting of one or more compounds having a dielectric anisotropy of greater than +1.5;

b) 10–65% by weight of a liquid-crystalline component B consisting of one or more compounds having a dielectric anisotropy of between −1.5 and +1.5;

c) 0–20% by weight of a liquid-crystalline component C consisting of one or more compounds having a dielectric anisotropy of below −1.5, and d) if desired, an optically active component D in such an amount that the ratio between the layer thickness (separation of the outer plates) and the natural pitch of the resultant chiral nematic liquid-crystal mixture is from about 0.2 to 1.3, characterized in that component A comprises at least one compound of the formula IA

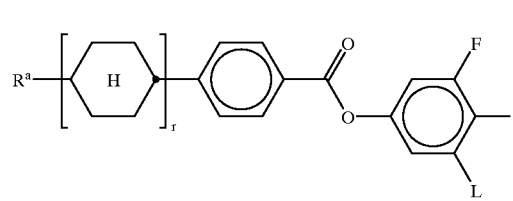

in which $R^a$ is an alkyl group having 1 to 12 carbon atoms, in which, in addition, one or two non-adjacent $CH_2$ groups may be replaced by —O—, —CH=CH—, —CO—, —OCO— or —COO—, L is H or F, and r is 0 or 1, and component B comprises at least one compound of the formula IB

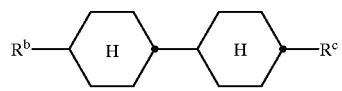

in which $R^b$ and $R^c$ are each, independently of one another, an alkenyl group having 2 to 7 carbon atoms.

The invention also relates to corresponding liquid-crystal mixtures for use in STN and TN displays, in particular in high-resolution STN displays.

Preferred compounds of the formula IA are, in particular, compounds of the subformulae IA1 to IA3:

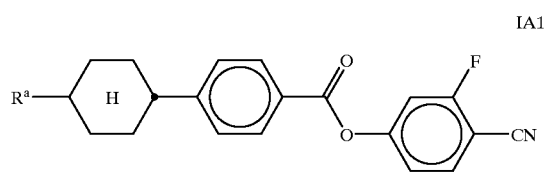

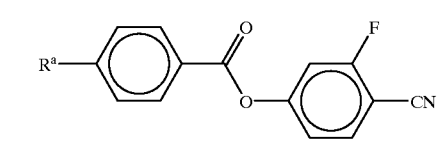

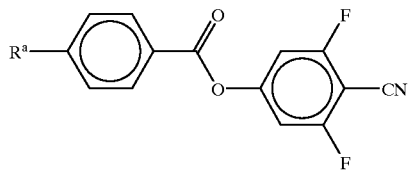

Preferred compounds of the formula IB are compounds in which $R^b$ and $R^c$ are 1E-alkenyl or 3E-alkenyl having 2 to 7 carbon atoms, in particular compounds of the formulae IB1 to IB3:

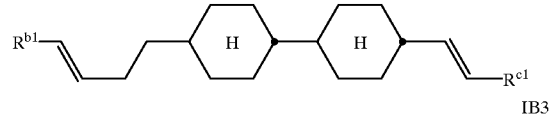

in which $R^{b1}$ and $R^{c1}$ are each, independently of one another, H, $CH_3$, $C_2H_5$ or $n-C_3H_7$.

Particular preference is given to liquid-crystal displays according to the invention in which component B comprises at least two compounds selected from the formulae IB1 and/or IB2 in which $R^{b1}$ and $R^{c1}$ each have the same definition.

Component A preferably comprises, in addition to the compounds of the formula IA, compounds of the formulae II and/or III

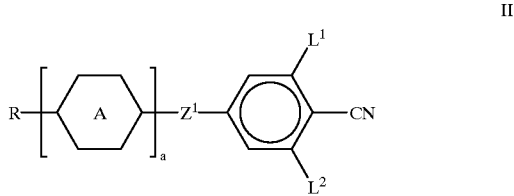

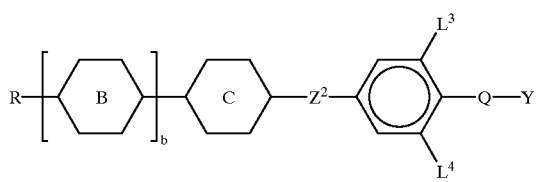

in which

R is an alkyl group having 1 to 12 carbon atoms, in which, in addition, one or two non-adjacent $CH_2$ groups may be replaced by —O—, —CH=CH—, —CO—, —OCO— or —COO—, in particular a trans-alkenyl group having 2 to 7 carbon atoms,

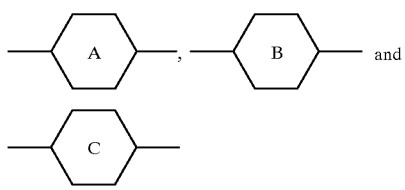

are each, independently of one another,

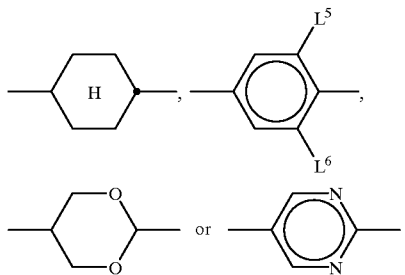

$L^{1-6}$ are each, independently of one another, H or F,
$Z^1$ is —COO—, —CH$_2$CH$_2$— or a single bond,
$Z^2$ is —CH$_2$CH$_2$—, —COO—, —C≡C— or a single bond,
Q is —CF$_2$—, —CHF—, —OCF$_2$—, —OCHF— or a single bond,
Y is F or Cl
a is 1 or 2, and
b is 0 or 1.

Preferred compounds of the formula II conform to the subformulae IIa to IId:

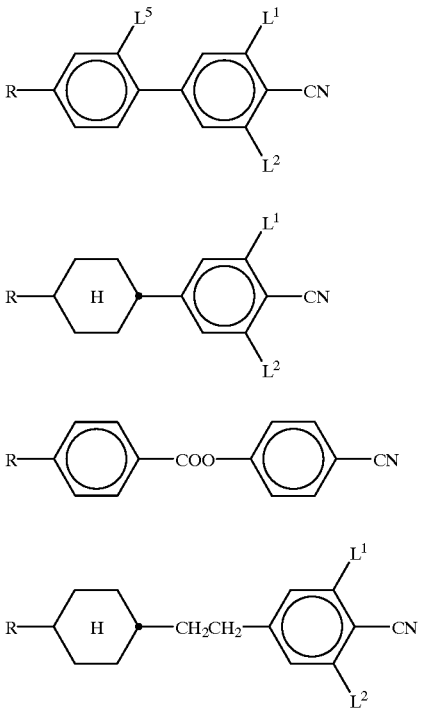

in which R, $L^1$, $L^2$ and $L^5$ are as defined above.

Further preferred compounds of component A conform to the sub-formula IIIa–IIIt or formula 3a–3g:

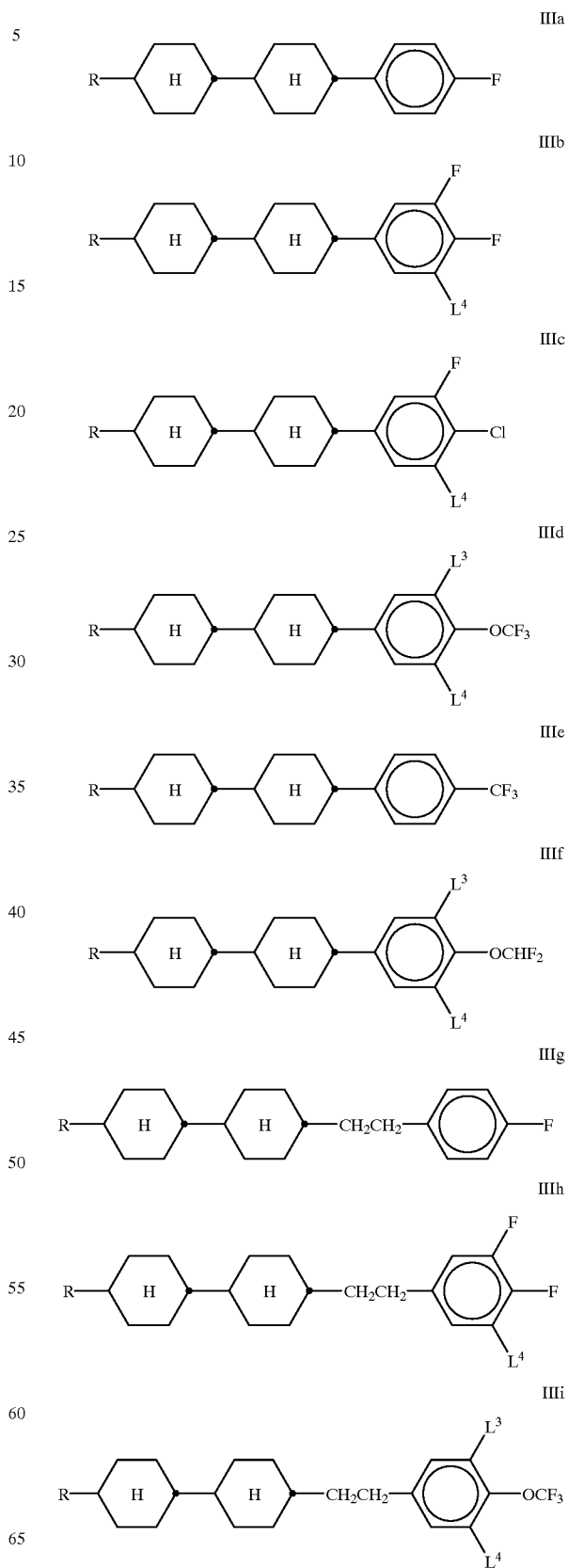

IIIj
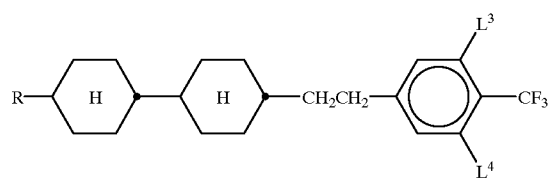

IIIk
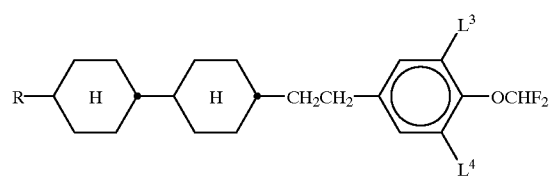

3a
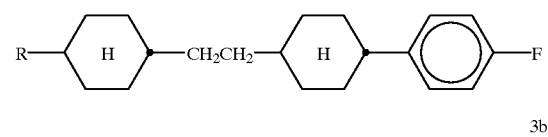

3b
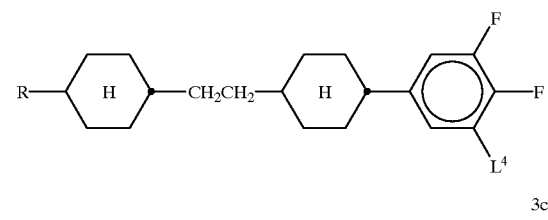

3c
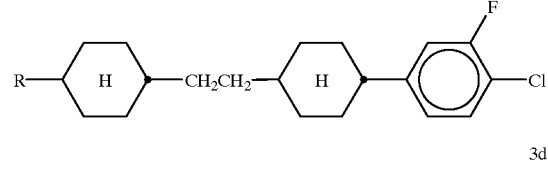

3d
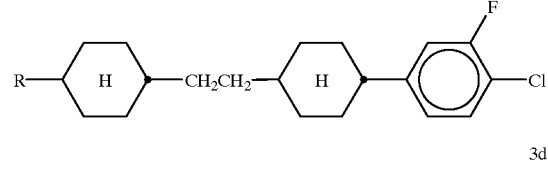

3e
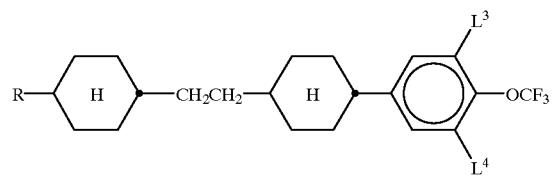

3f
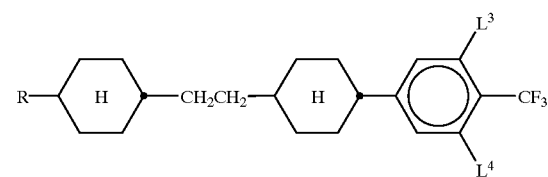

3g
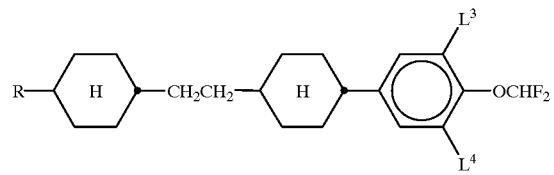

IIIs
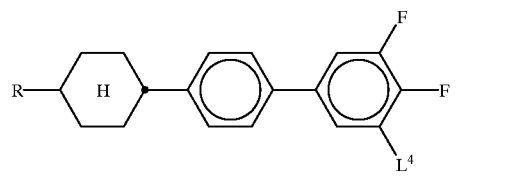

IIIt
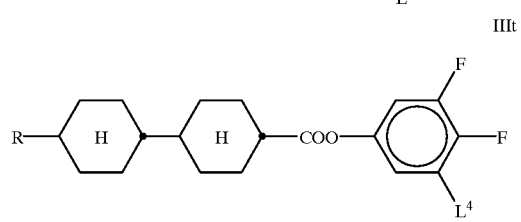

In addition to one or more compounds of the formula IA and IB, preferred mixtures comprise one, two, three, or more compounds of the formulae IIa, IIb, IIc, IId, IIIb, IIId, IIIf, IIIh, IIIi, 3b or IIIs, preferably one or more compounds of the formula IIIb, IIId or IIIh, and one to four compounds of the formulae IA and IB and one to three compounds of the formulae IIa and/or IIb.

Particular preference is given to mixtures which comprise one or more compounds of the formulae IIIb1

IIIb1
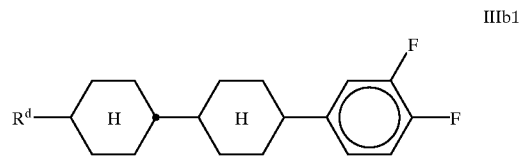

in which $R_d$ is as defined for $R^b$.

In these compounds, $R_d$ is particularly preferably vinyl, 1E-propenyl, 1E-butenyl, 3E-butenyl, 3E-pentenyl, in particular vinyl.

The individual compounds, for example, of the formulae II and III, and their subformulae, and the other compounds which can be used in the TN liquid-crystal displays and SLCDs according to the invention are either known or can be prepared analogously to the known compounds.

In a particularly preferred embodiment, component A additionally comprises compounds of the formulae AI to AV:

AI
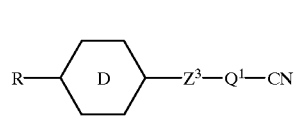

AII
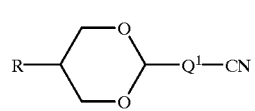

AIII

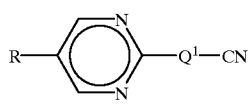

AIV

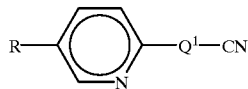

AV

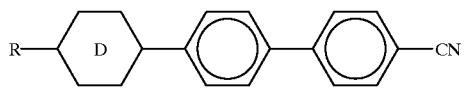

in which

R is an alkyl group having 1 to 12 carbon atoms, in which, in addition, one or two non-adjacent $CH_2$ groups may also be replaced by —O—, —CH=CH—, —CO—, —OCO— or —COO—, in particular a trans-alkenyl group having 2 to 7 carbon atoms, $Q^1$ is 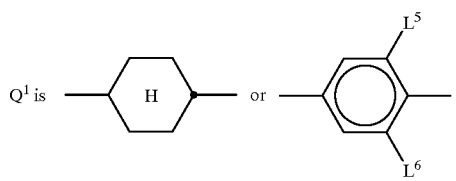

$L^5$ and $L^6$ are each, independently of one another, H or F,
$Z^3$ is

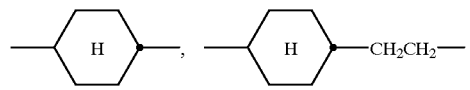

—$CH_2CH_2$—, —CO—O—,
—O—CO— or a single bond, and

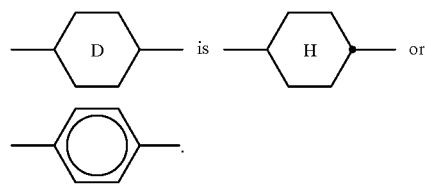

The mixtures preferably comprise from 5 to 50% of compounds of the formula AI. Preference is given to compounds of the formula AI in which $Z^3$ is —$CH_2CH_2$—, —COO— or a single bond, in particular compounds of the formulae IIa1, IIb1 and IIb2:

IIa1

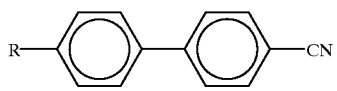

IIb1

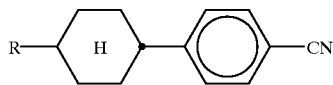

IId1

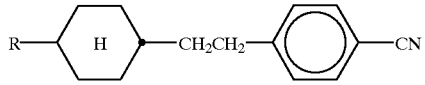

IIb2

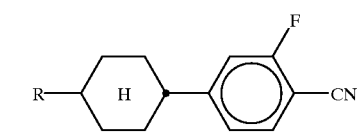

Component A preferably comprises one or more compounds of the formulae IIb1.

The mixtures according to the invention preferably comprise one or more polar compounds having a high clearing point selected from the group consisting of the compounds 2e to 2i:

2e

2f

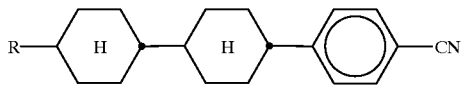

2g

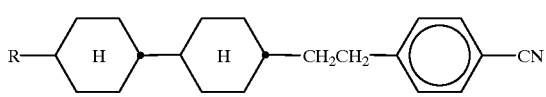

2h

2i

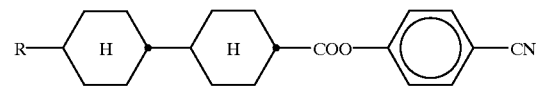

In the compounds 2e to 2i the 1,4-phenylene rings can also be laterally substituted by one or two fluorine atoms. Preferred compounds of this type are the compounds of the formulae 2e1, 2e2, 2e3 and 2i1:

2e1

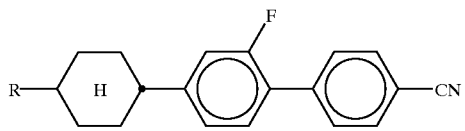

-continued

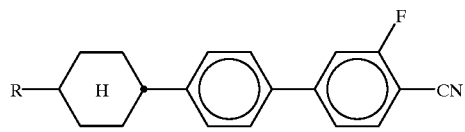
2e2

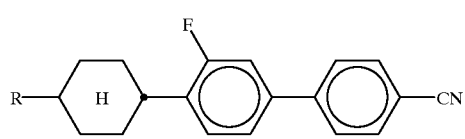
2e3

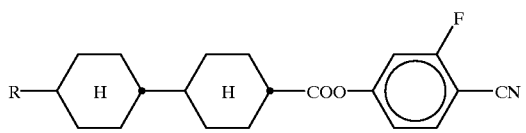
2i1

In the mixtures according to the invention, the proportion of compounds 2e to 2i is preferably from about 2 to 25%. Preferred liquid-crystal mixtures comprise one or more compounds from component B, preferably 10 to 40%. The compounds from component B are preferably distinguished both by their low rotational viscosity ($\gamma_1$) values of <150 mPa.s and by their high clearing point (>120° C.).

Component B preferably, in addition to one or more compounds of the formula IB, comprises one or more compounds selected from the group consisting of the compounds of the formulae IV1 to IV9:

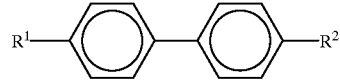
IV1

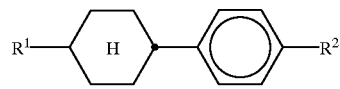
IV2

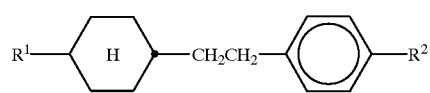
IV3

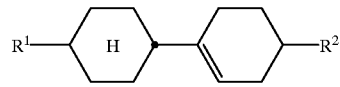
IV4

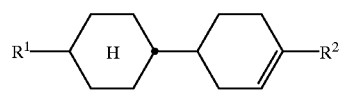
IV5

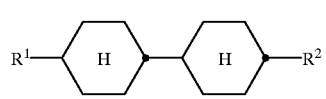
IV6

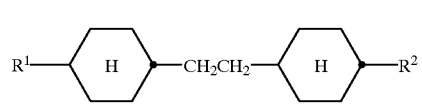
IV7

-continued

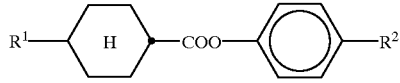
IV8

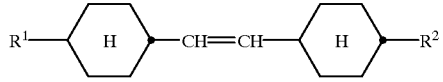
IV9 in which $R^1$ and $R^2$ are as defined for R.

In a particularly preferred embodiment, the mixture according to the invention comprises at least one compound of the formula IB and at least one compound of the formula IV2.

Component B additionally comprises one or more compounds selected from the group consisting of the compounds of the formulae IV10 to IV24:

IV10

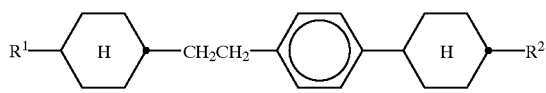
IV11

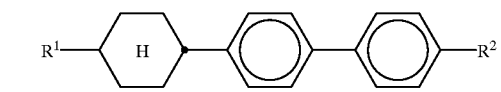
IV12

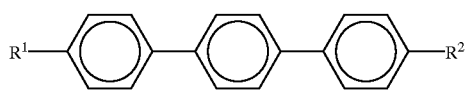
IV13

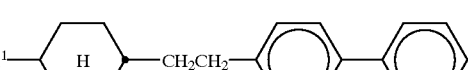
IV14

IV15

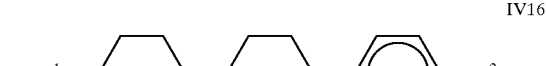
IV16

IV17

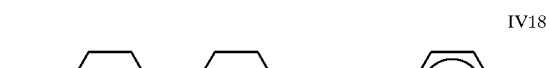
IV18

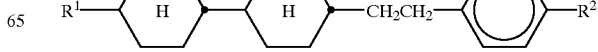

-continued

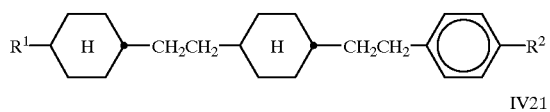
IV19

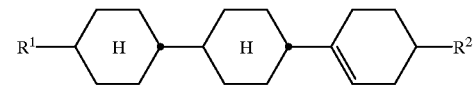
IV21

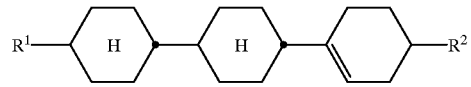
IV22

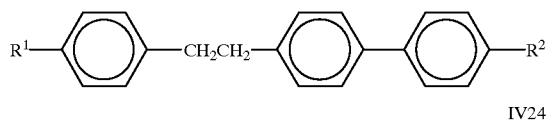
IV23

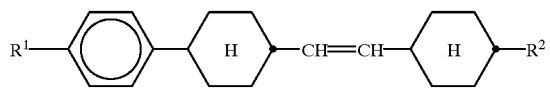
IV24

IV12a

IV16a in which $R^e$ is as defined for $R^b$, and $R^{e1}$ is straight-chain alkyl having 1 to 4 carbon atoms.

In these compounds, $R^e$ is particularly preferably vinyl, 1E-propenyl, 1-butenyl, 2E-butenyl or 2E-pentenyl. $R^{e1}$ is particularly preferably methyl, ethyl or propyl, in particular methyl or ethyl.

Component B additionally, in addition to one or more compounds of formula Ib, comprises one or more compounds selected from the group consisting of the compounds of the formulae IV25 to IV30:

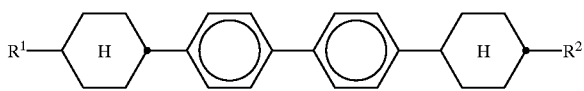
IV25

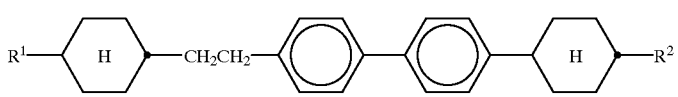
IV26

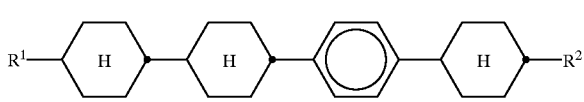
IV27

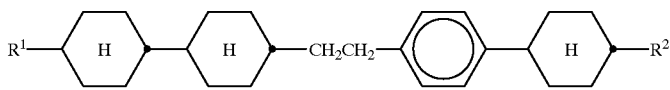
IV28

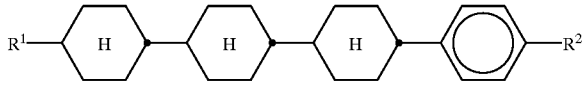
IV29

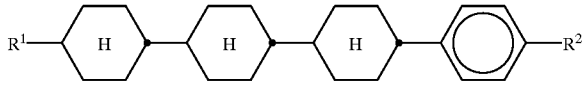
IV30 in which $R^1$ and $R^2$ are as defined for R, and the 1,4-phenylene groups in IV10 to IV19, IV23 and IV24 may each, independently of one another, also be monosubstituted or polysubstituted by fluorine.

Particular preference is given to mixtures comprising one or more compounds of the following formulae:

in which $R^1$ and $R^2$ are as defined for R, and the 1,4-phenylene groups in IV25 to IV30 may also each, independently of one another, be monosubstituted or polysubstituted by fluorine.

The term "alkenyl" in the definition of $R^b$ to $R^e$ covers straight-chain and branched alkenyl groups having 2–7 carbon atoms, in particular the straight-chain groups. Particularly preferred alkenyl groups are $C_2$-$C_7$-1E-alkenyl, $C_4$-$C_7$-3E-alkenyl, $C_5$-$C_7$-4-alkenyl, $C_6$-$C_7$-5-alkenyl, and $C_7$-6-alkenyl, in particular $C_2$-$C_7$-1E-alkenyl, $C_4$-$C_7$-3E-alkenyl and $C_5$-$C_7$-4-alkenyl.

Examples of preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 carbon atoms are generally preferred.

Component B optionally comprises one or more compounds selected from the group consisting of the compounds of the formulae IV31 and IV32:

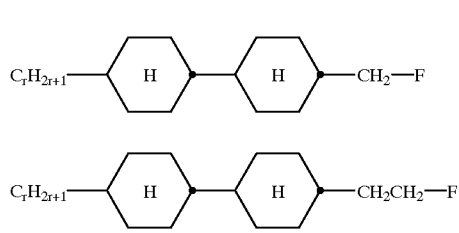

in which $C_rH_{2r+1}$ is a straight-chain alkyl group having up to 9 carbon atoms.

Besides components A, B and C, the liquid-crystal mixture according to the invention additionally comprises one or more compounds selected from the group

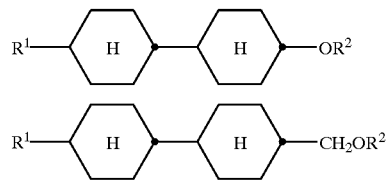

in which $R^1$ and $R^2$ are as defined for R.

Preferred liquid-crystal mixtures comprise at least one component selected from the group consisting of the following compounds:

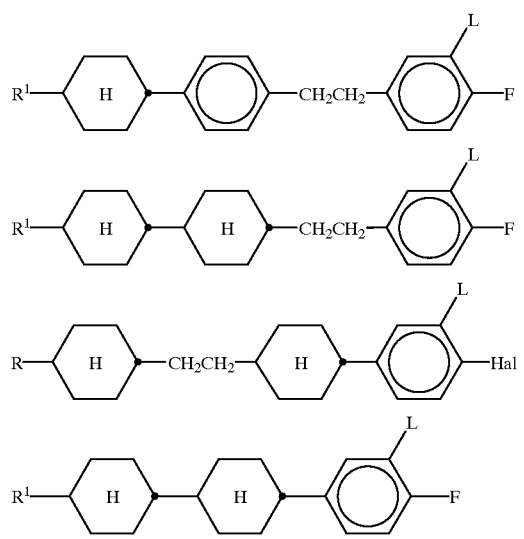

in which Hal is F or Cl, L is H or F, and R and $R^1$ are as defined above.

The liquid-crystal mixtures optionally comprise an optically active component C in such an amount that the ratio between the layer thickness (separation of the outer plates) and the natural pitch of the chiral nematic liquid-crystal mixture is greater than 0.2. For the component, a multiplicity of chiral dopes, some commercially available, are available to the person skilled in the art, for example such as cholesteryl nonanoate, S-811 from Merck KGaA, Darmstadt, FRG, and CB 15 (BDH, Poole, UK). The choice of dopes is not crucial per se.

The liquid-crystal mixture according to the invention preferably comprises one or more compounds selected from Group B1 consisting of compounds of the formulae B1I to B1IV:

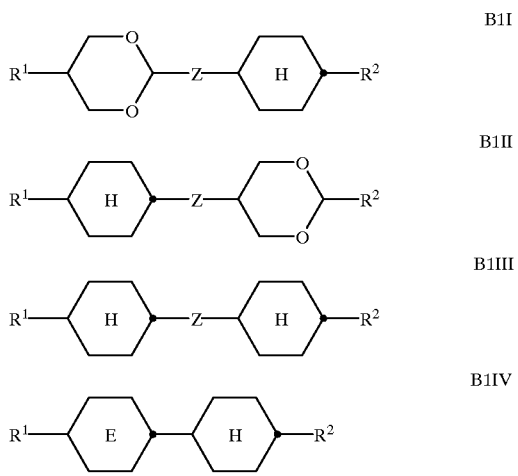

in which $R^1$ and $R^2$ are each, independently of one another, as defined for R, Z is —$CH_2CH_2$—, —CO—O—, —O—CO— or a single bond, and,

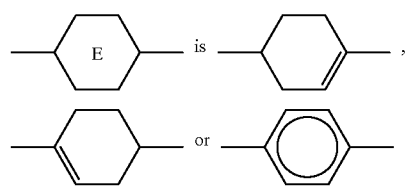

and/or at least one compound selected from Group B2 consisting of compounds of the formulae B1V to B1VII:

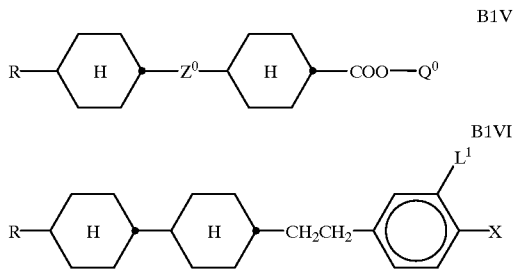

-continued

B1VII

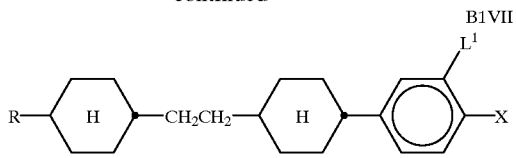

in which
R is as defined above,
$Z^0$ is —CH$_2$CH$_2$— or a single bond,
$Q^0$ is

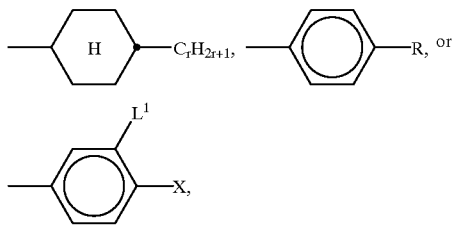

where r is 1–9,
X is CN or F,
$L^1$ is H or F,
and/or at least one compound selected from Group B3 consisting of compounds of the formulae B1VIII, B1IX and B1X:

B1VIII

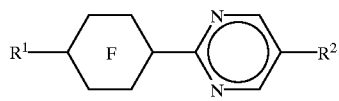

B1IX

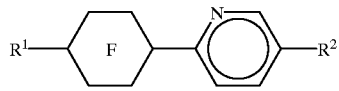

B1X

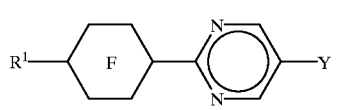

in which
$R^1$ and $R^2$, independently of one another, are as defined for R,
Y is F or Cl, and

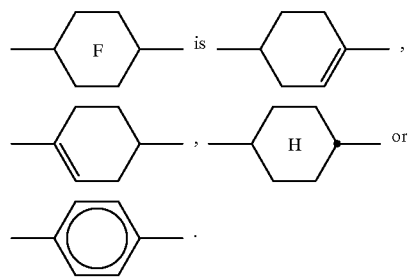

In a particularly preferred embodiment, the mixtures according to the invention comprise from about 5 to 35%, in particular from 10 to 20%, of liquid-crystalline tolan compounds. This enables smaller layer thicknesses (about 5–6 μm) to be used, significantly shortening the response times. Particular preference is given to mixtures comprising one or more compounds selected from Group T consisting of the compounds of the formulae T1 to T3:

T1

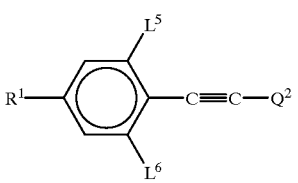

T2

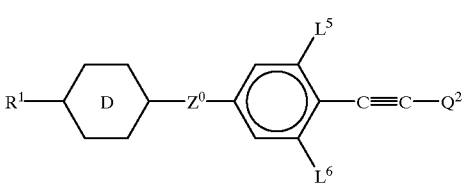

T3

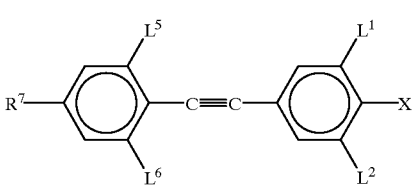

in which the individual radicals have the following meaning

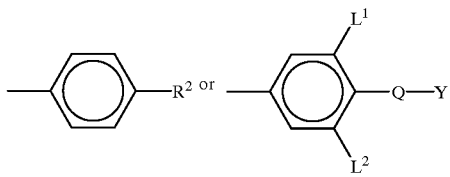

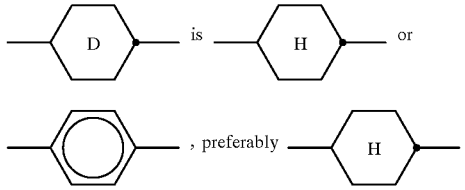

t is 0 or 1,
$L^1$, $L^2$, $L^5$ and $L^6$ are each, independently of one another, H or F,
Q is —CF$_2$—, —CHF—, —OCF$_2$—, —OCHF— or a single bond,
Y is F or Cl,
$Z^0$ is —CO—O—, —CH$_2$CH$_2$— or a single bond, and $R^1$ and $R^2$ are each, independently of one another, as defined for R, $R^7$ is $-C_xH_{2x+1}$, $-OC_xH_{2x+1}$,

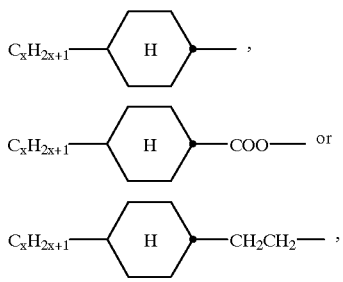

x is an integer from 1 to 15, and

X' is F, Cl or $OCF_3$.

The proportion of compounds from the group T is preferably from 5 to 30%, in particular from 5 to 20%.

The liquid-crystalline tolan compounds present in the mixtures according to the invention can, depending on their dielectric anisotropy values, be assigned to one of components A, B and C according to the limit values mentioned for these components.

Component B preferably comprises one or more compounds of the formulae X to XIII:

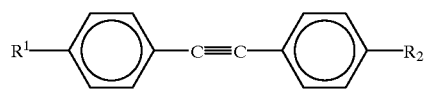

X

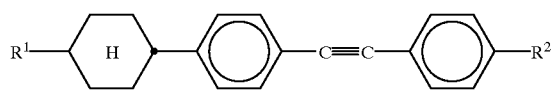

XI

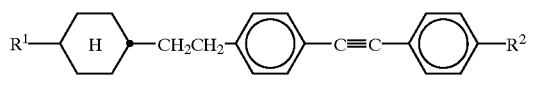

XII

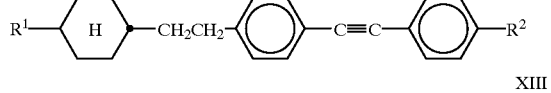

XIII in which $R^1$ and $R^2$ are each, independently of one another, as defined for R, and $R^1$ is preferably alkyl having 1 to 4 carbon atoms, in particular 1 to 2 carbon atoms, and $R^2$ is preferably alkoxy having 1 to 4 carbon atoms, in particular 1 to 2 carbon atoms.

The proportion of compounds from group B1 is preferably from 10 to 50%, in particular from 15 to 40%. Compounds of the formula B1III and B1IV are preferred.

Particularly preferred compounds of the formula B1III are those of the following subformulae B1IIIa and B1IIIb

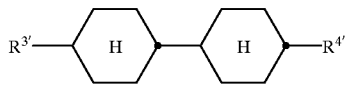

B1IIIa

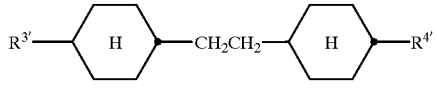

B1IIIb in which $R^{3'}$ is $CH_3-(CH_2)_o-$, $CH_3-(CH_2)_o-O-$, $CH_3-(CH_2)_p-$, trans-H-$(CH_2)_q-CH=CH-(CH_2CH_2)_b-CH_2O-$ or trans-H-$(CH_2)_q-CH=CH-(CH_2CH_2)_b-$; $CH_3-(CH_2)_o-O-CH_2-$, $R^{4'}$ is $CH_3-(CH_2)_p-$, o is 0, 1, 2, 3 or 4, q is 0, 1, 2 or 3, b is 0 or 1, and p is 1, 2, 3 or 4.

Particular preference is given to compounds of the subformula B1IIIa in which $R^{3'}$ is trans-H-$(CH_2)_q-CH=CH-$ and the formula B1III in which one of the radicals $R^1$ or $R^2$ is $O-(CH_2)_o-CH_3$ or $CH_2-O-(CH_2)_o-CH_3$.

Preference is furthermore given to the compounds of the subformula

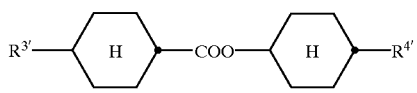

in which $R^{3'}$ and $R^{4'}$ are each, independently of one another, as defined above.

The proportion of compounds of the abovementioned sub-formulae of formula B1III is preferable from about 5 to 45%, particularly preferably from about 10% to 35%. Particularly preferred compounds of the formula B1IV are those of the following subformula

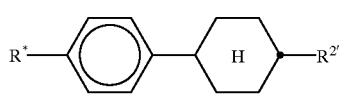

in which

R* is $CH_3-(CH_2)_o-O-$ or trans-H-$(CH)_q-CH=CH-((H_2CH_2)_b-CH_2O-$, and $R^{2'}$ is $CH_3-(CH_2)_p-$, where o is 0, 1, 2, 3 or 4, q is 0, 1, 2 or 3, b is 0 or 1, and p is 1, 2, 3 or 4.

The proportion of these compounds or of compounds of the formula BIV is preferably from about 5 to 40%, particularly preferably from about 10 to 35%.

In a particularly preferred embodiment, the mixtures simultaneously comprise compounds of the formulae B1III and B1IV, where the total proportion of components from group B1 remains observed.

If compounds of the formulae B1I and/or B1III are present, $R^1$ and $R^2$ are preferably each, independently of one another, n-alkyl having 1 to 7 carbon atoms or (trans)-n-alkenyl having 3 to 7 carbon atoms. Z is preferably a single bond.

Preference is furthermore given to mixtures according to the invention which comprise one or more compounds of the formula B1IV in which

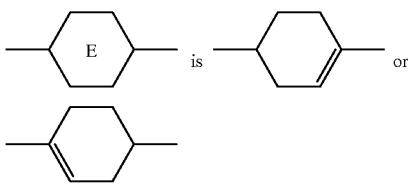

and $R^1$ and $R^2$ have one of the preferred meanings given above, particularly preferably n-alkyl having 1 to 7 carbon atoms.

In all cases, the total proportion of components from group B1 remains observed.

The proportion of compounds from group B2 is preferably from about 5 to 45%, in particular from 5 to 20%. The proportion (preferred ranges) for B1V to B1VII is as follows:

B1V: from about 5 to 30%, preferably from about 5 to 15% Sum of B1VI and B1VII: from about 5 to 25%, preferably from about 10 to 20%.

Preferred compounds from group B2 are shown below:

B1V1
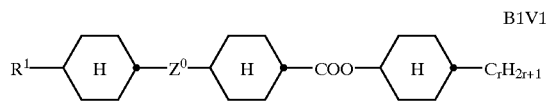

B1V2
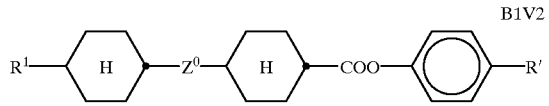

B1V3

B1VI1
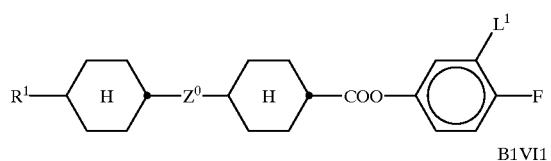

B1VII1
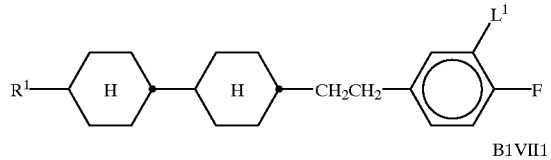

B1VIII1
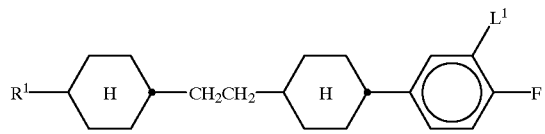

$R^1$ is preferably n-alkyl having 1 to 7 carbon atoms or (trans)-n-alkenyl having 2 to 7 carbon atoms. $Z^0$ is preferably a single bond. R' preferably has the preferred meaning given above for R or is fluorine. $L^1$ is preferably fluorine and r is 1–9.

The mixtures according to the invention preferably comprise one or more compounds selected from the group consisting of B1V3, B1VI1 and B1VII1 in a total proportion of from about 5 to 35%.

In a particularly preferred embodiment, the mixtures according to the invention, in addition to B1V3, B1VI1 and B1VIII1 ($L^1$=F), comprise further terminally fluorinated compounds selected, for example, from the group consisting of

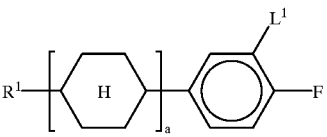

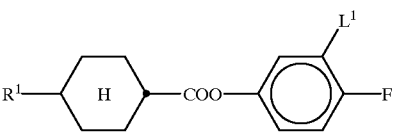

and/or polar heterocyclic compounds selected from the group consisting of

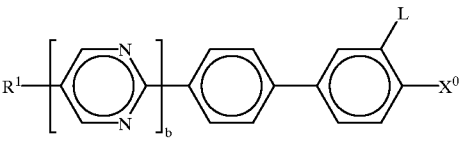

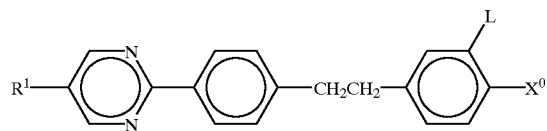

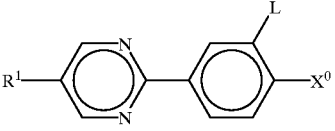

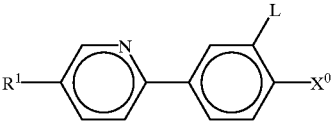

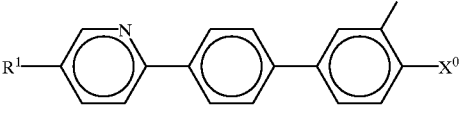

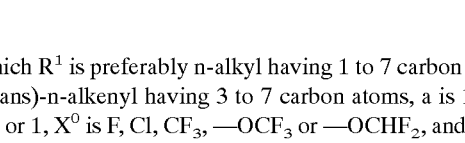

in which $R^1$ is preferably n-alkyl having 1 to 7 carbon atoms or (trans)-n-alkenyl having 3 to 7 carbon atoms, a is 1 or 2, b is 0 or 1, $X^0$ is F, Cl, $CF_3$, —$OCF_3$ or —$OCHF_2$, and L and $L^1$ are H or F.

The total proportion of all terminally fluorinated compounds is preferably from about 5 to 65%, in particular from about 15 to 40%.

The proportion of compounds from group B3 is preferably from about 5 to 30%, particularly preferably from about 10 to 20%. $R^1$ is preferably n-alkyl or n-alkoxy, in each case having 1 to 9 carbon atoms.

However, it is also possible to use analogous compounds containing alkenyl or alkenyloxy groups. Compounds of the formula B1VIII are preferred.

The mixtures according to the invention comprise compounds of the formulae IA and IB and preferably compounds from at least one of groups B1, B2 and B3. They preferably comprise one or more compounds from group B1 and one or more compounds from group B2 and/or B3.

The proportion of compounds of component C is preferably from 0 to 20%, in particular from 0 to 10%.

In a particularly preferred embodiment, the mixtures according to the invention preferably comprise from about 5 to 20% of one or more compounds having a dielectric anisotropy of below −2 (component C). Such compounds are known, for example derivatives of 2,3-dicyanohydroquinones or cyclohexane derivatives containing the structural unit

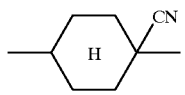

as defined in DE-A 32 32 707 or DE-A 34 07 013.

However, preference is given to compounds containing the structural unit 2,3-difluoro-1,4-phenylene, for example compounds as described in DE-A 38 07 801, DE 38 07 861, DE 38 07 863, DE 38 07 864 or DE 38 07 908. Particular preference is given to tolans containing this structural unit, as described in International Patent Application PCT/DE 88/00133, in particular those of the formulae

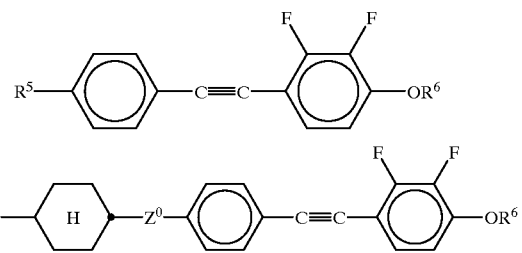

in which $R^5$ and $R^6$ are each, independently of one another, preferably n-alkyl having 1 to 7 carbon atoms or n-alkenyl having 3 to 7 carbon atoms, and $Z^0$ is —COO—CH$_2$CH$_2$— or a single bond.

Particular preference is given to phenylcyclohexyl carboxylates of the formulae

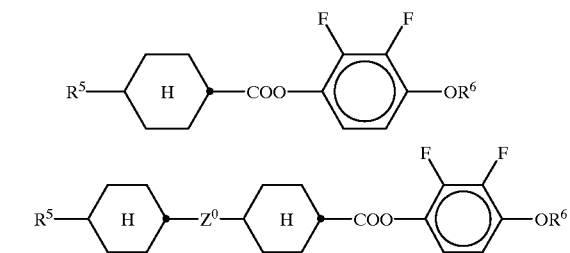

Component C preferably comprises one or more compounds selected from the group consisting of V to IX:

V

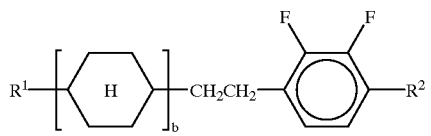

VI

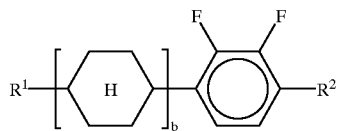

VII

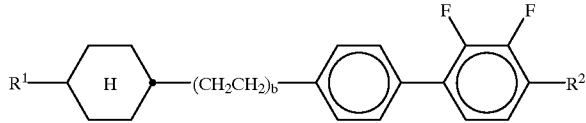

VIII

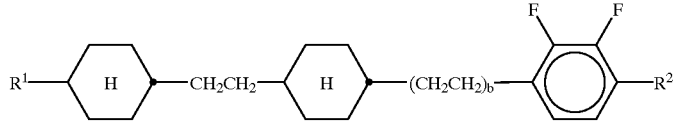

IX

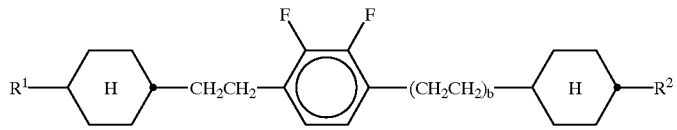

in which $R^1$ and $R^2$ are as defined for R, and b is 0 or 1.

In particular, component C results in increased steepness of the characteristic line.

Component B preferably further comprises one or more compounds selected from the group consisting of Xa to XIIa:

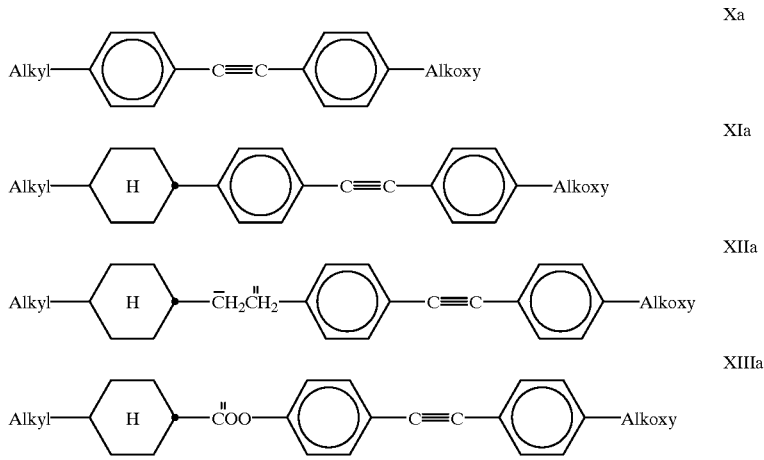

in which Alkyl and Alkoxy are a straight-chain alkyl or alkoxy radical having 1 to 7 carbon atoms.

In further particularly preferred embodiments,

Component C comprises one or more compounds containing a 1-cyano-trans-1,4-cyclohexyl group or a 2,3-difluoro-1,4-phenylene group;

at least two compounds of the formulae AIII or AV;

compounds of the formulae AIII and AV;

at least one compound from the group consisting of:

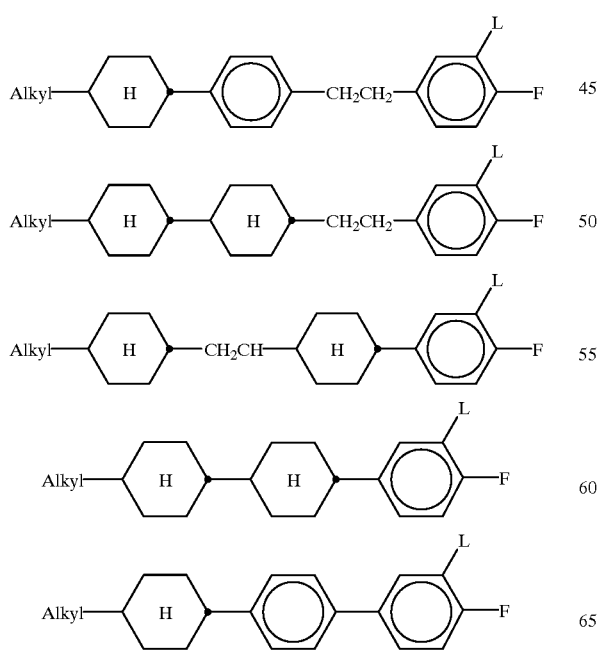

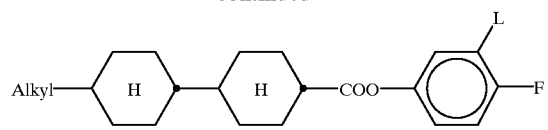

in which Alkyl is a straight-chain alkyl or alkenyl radical having 2 to 7 carbon atoms, and L is H or F;

one or more compounds in which R is a trans-alkenyl group or a trans-alkenyloxy group;

one or more compounds selected from the following group:

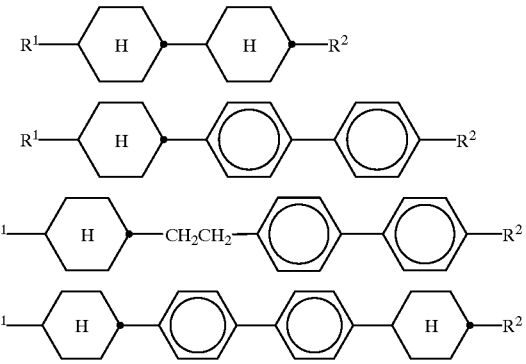

in which $R^1$ and $R^2$ have the preferred meanings given under compounds of component B. The 1,4-phenylene groups in the abovementioned compounds can also be substituted by fluorine. The proportion of these compounds in the liquid-crystal mixtures is from 0 to 25%, preferably from 5 to 15%.

In further preferred embodiments, the mixtures comprise
  one or more, in particular 1, 2, 3 or 4, compounds selected from the compounds of the formulae IIIb, IIId, IIIf, IIIh and IIIi;
  at least two compounds selected from the compounds of the formulae IIa1, IIb1 and IIb2;

one or more compounds of the formula B1IV;
one or more compounds of the formula T1 or T2;
one or more compounds of the formulae

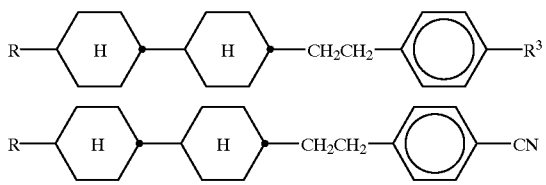

in which R is as defined under the formula III.

In a preferred embodiment, the liquid-crystalline media according to the invention comprise 3, 4, 5 or 6 compounds of the formula IA and/or IB; the content of these compounds is generally from 10 to 60% by weight, preferably from 15 to 50% by weight, based on the overall mixture.

Media comprising compounds of the formula IB in which $R^b$ is H are particularly preferred.

In particular when used in SLCDs and TN displays having high layer thicknesses, the mixtures according to the invention are distinguished by very low overall response times ($=t_{on}+t_{off}$).

Low overall response times are an important criterion, in particular, in SLCDs for use as displays in laptops in order to be able to display cursor movements without interference.

The liquid-crystal mixtures used in the STN and TN cells according to the invention are dielectrically positive with $\Delta\epsilon \geq 1$. Particular preference is given to liquid-crystal mixtures where $\Delta\epsilon \geq 3$ and very particularly to those where $\Delta\epsilon \geq 5$.

The liquid-crystal mixtures according to the invention have favorable values for the threshold voltage $V_{10/0/20}$ and for the rotational viscosity $\gamma_1$. If the value for the optical path difference d.$\Delta$n is specified, the value for the layer thickness d is determined by the optical anisotropy $\Delta$n. In particular at relatively high values for d.$\Delta$n, the use of liquid-crystal mixtures according to the invention having a relatively high value for the optical anisotropy is generally preferred since the value for d can then be chosen to be relatively small, which results in more favorable values for the response times. However, liquid-crystal displays according to the invention which contain liquid-crystal mixtures according to the invention having relatively small values for $\Delta$n are also characterized by advantageous values for the response times. The liquid-crystal mixtures according to the invention are furthermore characterized by advantageous values for the steepness of the electrooptical characteristic line and can be operated at high multiplex rates. In addition, the liquid-crystal mixtures according to the invention have high stability and favorable values for the electrical resistance and the frequency dependence of the threshold voltage. The liquid-crystal displays according to the invention have a broad operating temperature range and good angle dependence of the contrast.

The construction of the liquid-crystal display elements according to the invention from polarizers, electrode baseplates and electrodes with a surface treatment such that the preferential alignment (director) of the liquid-crystal molecules in each case adjacent thereto is usually twisted by a value of from 160° to 720° from one electrode to the next, corresponds to the structure which is conventional for display elements of this type. The term conventional structure here is broadly drawn and also includes all derivatives and modifications of the TN and STN cell, in particular also matrix display elements, and display elements which contain additional magnets. The surface tilt angle at the two outer plates may be identical or different. Identical tilt angles are preferred. Preferred TN displays have pretilt angles between the longitudinal axis of the molecules at the surface of the outer plates and the outer plates of from 0° to 7°, preferably from 0.01° to 5°, in particular from 0.1 to 2°. In STN displays, the pretilt angle is from 1° to 30°, preferably from 1° to 12°, in particular from 3° to 8°.

The twist angle of the TN mixture in the cell has a value of between 22.5° and 170°, preferably between 45° and 130°, in particular between 80° and 115°. The twist angle of the STN mixture in the display from alignment layer to alignment layer has a value of between 100° and 600°, preferably between 170° and 300°, in particular between 180° and 270°.

The liquid-crystal mixtures which can be used according to the invention are prepared in a manner which is known per se. In general, the desired amount of the components used in a lesser amount is dissolved in the components making up the principal constituent, expediently at elevated temperature. It is also possible to mix solutions of the components in an organic solvent, for example in acetone, chloroform or methanol, and, after mixing, to remove the solvent again, for example by distillation.

The dielectrics may also contain further additives which are known to a person skilled in the art and are described in the literature. For example, 0–15% of pleochroic dyes may be added.

In the foregoing and in the following examples, all temperatures are set forth uncorrected in degrees Celsius; and, unless otherwise indicated, all parts and percentages are by weight.

The entire disclosure of all applications, patents and publications, cited above and below, and of corresponding German Application No. 197 07 956.3, filed Feb. 27, 1997 is hereby incorporated by reference.

The examples below are intended to illustrate the invention without representing a limitation.

The following abbreviations are used:

| | |
|---|---|
| S-N | smectic-nematic phase transition temperature, |
| N-I | nematic-isotropic phase transition temperature, |
| c.p. | clearing point, |
| visc. | rotational viscosity (mPa.s) |
| $t_{on}$ | time from switching on until 90% of the maximum contrast is achieved, |
| $t_{off}$ | time from switching off until 10% of the maximum contrast is achieved, |
| $V_{90}/V_{10}$ | steepness, |
| $t_{ave}$ | $\frac{t_{on} + t_{off}}{2}$ (average response time). |

The SLCD is operated in multiplex mode (multiplex ratio 1:240, bias 1:16, operating voltage between 20 and 30 volts, so that $t_{on}=t_{off}$).

Above and below, all temperatures are indicated in °C. The percentages are per cent by weight. The values for the response times and viscosities relate to 20° C.

In the present application and in the examples below, the structures of the liquid-crystal compounds are indicated by acronyms, the transformation into chemical formulae taking place in accordance with tables A and B below. All radicals $C_nH_{2n+1}$ and $C_mH_{2m+1}$ are straight-chain alkyl radicals having n and m carbon atoms respectively. The alkenyl radicals have the trans-configuration. The coding in Table B is self-evident. In Table A, only the acronym for the parent stricture is given. In individual cases, the acronym for the parent structure is followed, separated by a dash, by a code for the substituents $R^1$, $R^2$, $L^1$, $L^2$ and $L^3$:

| Code for $R^1$, $R^2$ $L^1$, $L^2$, $L^3$ | $R^1$ | $R^2$ | $L^1$ $L^2$ $L^3$ |
|---|---|---|---|
| nm | $C_mH_{2m+1}$ | $C_nH_{2n+1}$ | H H H |
| nOm | $OC_mH_{2m+1}$ | $C_nH_{2n+1}$ | H H H |
| nO.m | $C_mH_{2m+1}$ | $OC_nH_{2n+1}$ | H H H |
| n | CN | $C_nH_{2n+1}$ | H H H |
| nN.F | CN | $C_nH_{2n+1}$ | H H F |
| nF | F | $C_nH_{2n+1}$ | H H H |
| nOF | F | $OC_nH_{2n+1}$ | H H H |
| nCl | Cl | $C_nH_{2n+1}$ | H H H |
| nF.F | F | $C_nH_{2n+1}$ | H H F |
| nmF | $C_m^2{}_{2m+1}$ | $C_nH_{2n+1}$ | H F H |
| $nCF_3$ | $CF_3$ | $C_nH_{2n+1}$ | H H H |
| $nOCF_3$ | $OCF_3$ | $C_nH_{2n+1}$ | H H H |
| $nOCF_2$ | $OCHF_2$ | $C_nH_{2n+1}$ | H H H |
| nS | NCS | $C_nH_{2n+1}$ | H H H |
| rVsN | CN | $C_rH_{2r+1}$—CH=CH—$C_sH_{2s}$— | H H H |
| rEsN | CN | $C_rH_{2r+1}$—O—$C_2H_{2s}$— | H H H |
| nNF | CN | $C_nH_{2n+1}$ | H F H |
| nAm | $COOC_mH_{2m+1}$ | $C_nH_{2n+1}$ | H H H |
| nF.Cl | Cl | $C_nH_{2n+1}$ | H H F |
| n-Vm | —CH=CH—$C_mH_{2m+1}$ | $C_nH_{2n+1}$ | H H H |
| nV—Vm | —CH=CH—$C_mH_{2m+1}$ | $C_nH_{2n+1}$—CH=CH— | H H H |
| nV-m | —$C_mH_{2m+1}$ | $C_nH_{2n+1}$—CH=CH— | H H H |
| nV—Om | —$OC_mH_{2m+1}$ | $C_nH_{2n+1}$—CH=CH— | H H H |
| nV—N | $C_nH_{2n+1}$—CH=CH— | —CN | H H H |
| nV—F | $C_nH_{2n+1}$—CH=CH— | F | H H H |
| nV—F.F | $C_nH_{2n+1}$—CH=CH— | F | H H F |
| n-2Vm | $C_nH_{2n+1}$ | $C_mH_{2m+1}$—CH=CH—$CH_2CH_2$— | H H H |

The TN and STN displays preferably contain liquid-crystalline mixtures composed of one or more compounds from Tables A and B.

TABLE A ($L^1$, $L^2$, $L^3$ = H or F)

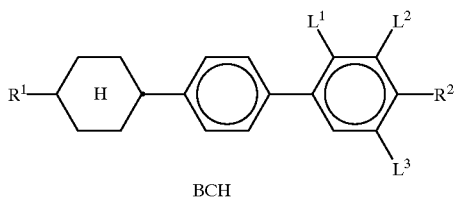

BCH

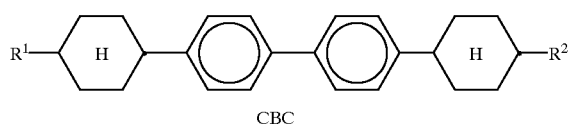

CBC

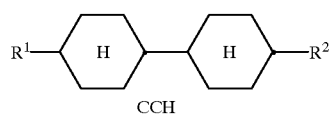

CCH

TABLE A-continued ($L^1$, $L^2$, $L^3$ = H or F)

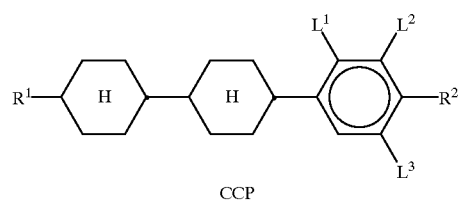

CCP

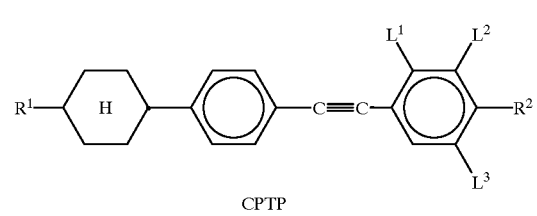

CPTP

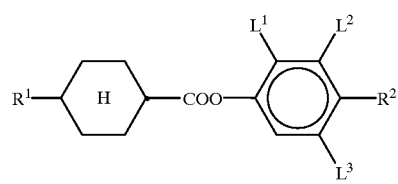

D

TABLE A-continued
($L^1$, $L^2$, $L^3$ = H or F)
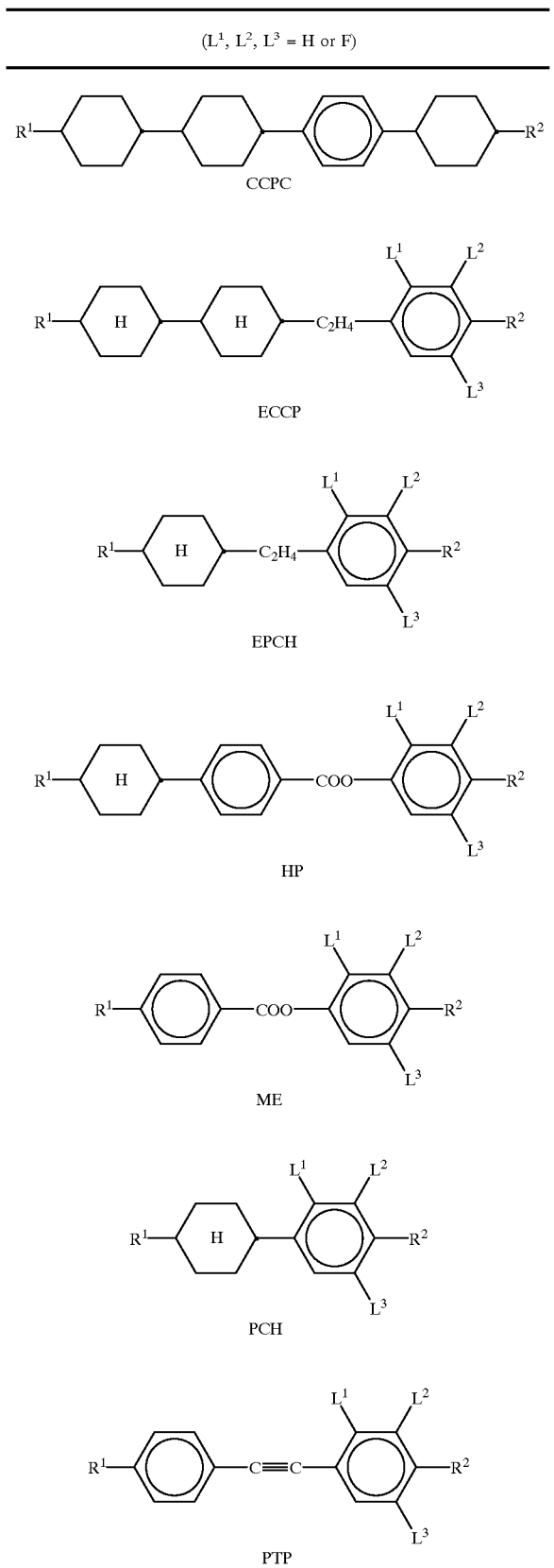
TABLE A-continued
($L^1$, $L^2$, $L^3$ = H or F)
TABLE B
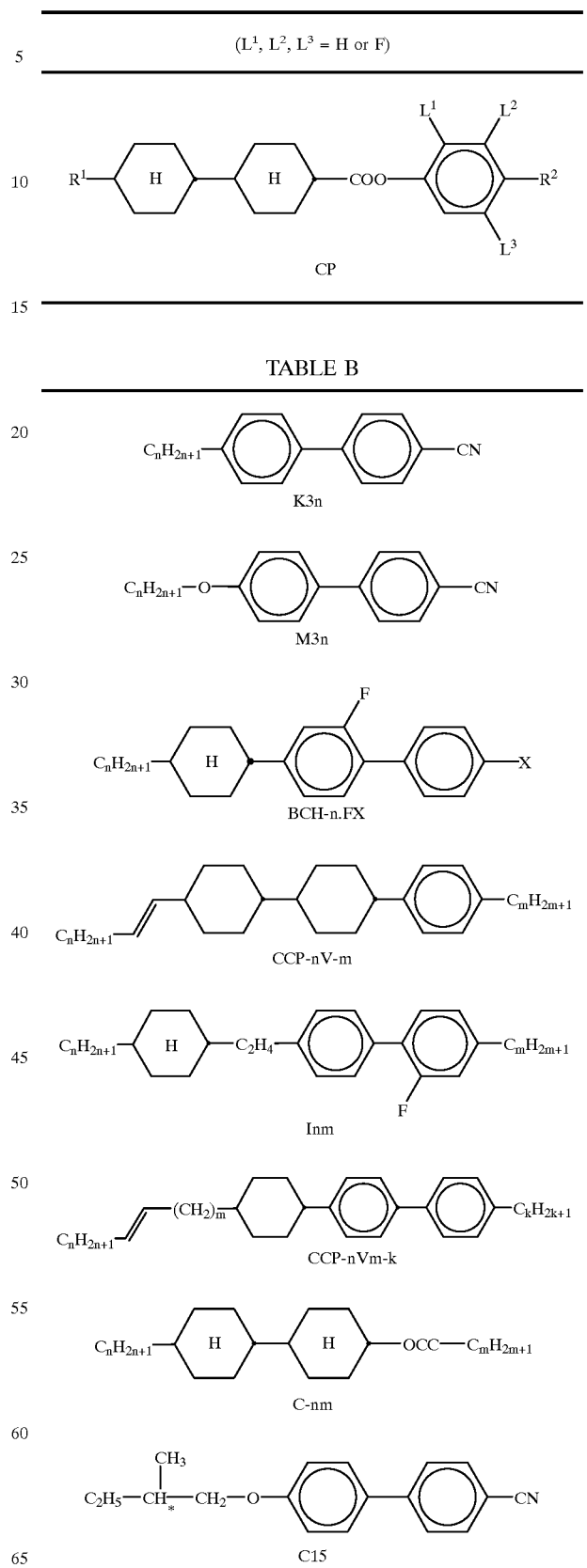

TABLE B-continued

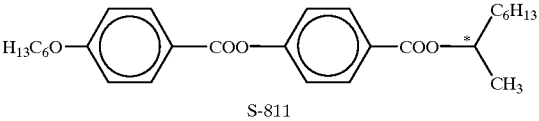
S-811

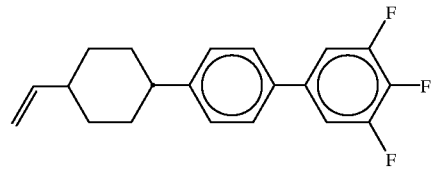
CCG-V-F

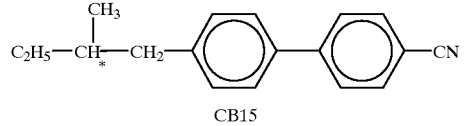
CB15

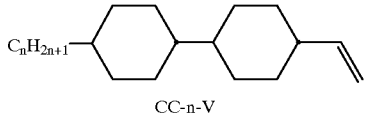
CC-n-V

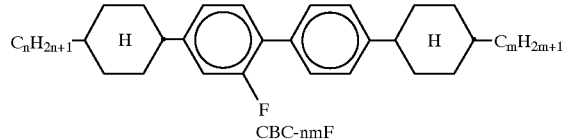
CBC-nmF

CC-V-V

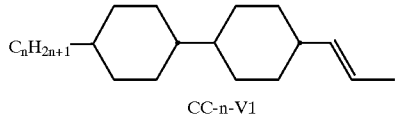
CC-n-V1

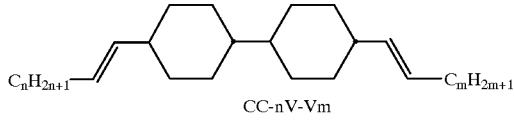
CC-nV-Vm

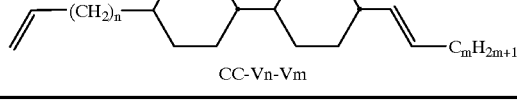
CC-Vn-Vm

The examples below are intended to illustrate the invention without representing a limitation. Above and below, percentages are per cent by weight. All temperatures are given in degrees celsius. m.p. denotes melting point, c.p.= clearing point. Furthermore, C=crystalline state, N=nematic phase, S=smectic phase and I=isotropic phase. The numbers between these symbols are the transition temperatures. $\Delta n$ denotes optical anisotropy (589 nm, 20° C.), $V_{10}$ denotes the threshold voltage and $V_{90}/V_{10}$ denotes the steepness of the characteristic line of the liquid-crystal display according to the invention. Unless stated otherwise, the response time is the mean of the switch-on and switch-off times.

EXAMPLE 1

| An STN mixture comprising | | | |
|---|---|---|---|
| PCH-3 | 13.00% | Clearing point: | 93.5° C |
| K6 | 7.00% | $\Delta n$: | 0.1211 |
| ME2N.F | 3.00% | $n_o$: | 1.4995 |
| ME3N.F | 2.00% | Twist: | 240° |
| ME4N.F | 4.00% | $V_{10}$: | 2.20 V |
| CBC-33 | 4.00% | $V_{90}/V_{10}$: | 1.03 |
| CBC-33F | 4.00% | Response time: | 292 ms |
| CC-V-V | 20.00% | | |
| CCP-V-1 | 14.00% | | |
| CCP-V2-1 | 15.00% | | |
| CPP-1V2-2 | 5.00% | | |
| CCG-V-F | 9.00% | | |

EXAMPLE 2

| An STN mixture comprising | | | |
|---|---|---|---|
| PCH-3 | 13.00% | Clearing point: | 114° C |
| K6 | 7.00% | $\Delta n$: | 0.1306 |
| ME2N.F | 3.00% | $n_o$: | 1.4990 |
| ME3N.F | 2.00% | Twist: | 240° |
| ME4N.F | 4.00% | $V_{10}$: | 2.47 V |
| CBC-33 | 4.00% | $V_{90}/V_{10}$: | 1.019 |
| CBC-33F | 4.00% | Response time: | 303 ms |
| CC-1V-V1 | 20.00% | | |
| CCP-V-1 | 14.00% | | |
| CCP-V2-1 | 15.00% | | |
| CPP-1V2-2 | 5.00% | | |
| CCG-V-F | 9.00% | | |

EXAMPLE 3

| An STN mixture comprising | | | |
|---|---|---|---|
| PCH-3 | 13.00% | Clearing point: | 110° C |
| K6 | 7.00% | $\Delta n$: | 0.1259 |
| ME2N.F | 3.00% | $n_o$: | 1.4986 |
| ME3N.F | 2.00% | Twist: | 240° |
| ME4N.F | 4.00% | $V_{10}$: | 2.33 V |
| CBC-33 | 4.00% | $V_{90}/V_{10}$: | 1.041 |
| CBC-33F | 4.00% | Response time: | 298 ms |
| CC-2V-V2 | 20.00% | | |
| CCP-V-1 | 14.00% | | |
| CCP-V2-1 | 15.00% | | |
| CPP-1V2-2 | 5.00% | | |
| CCG-V-F | 9.00% | | |

EXAMPLE 4

| An STN mixture comprising | | | |
|---|---|---|---|
| PCH-3 | 13.00% | Clearing point: | 99° C |
| K6 | 7.00% | $\Delta n$: | 0.1230 |
| ME2N.F | 3.00% | $n_o$: | 1.4181 |
| ME3N.F | 2.00% | Twist: | 240° |
| ME4N.F | 4.00% | $V_{10}$: | 2.39 V |
| CBC-33 | 4.00% | $V_{90}/V_{10}$: | 1.026 |
| CBC-33F | 4.00% | Response time: | 254 ms |

-continued

| An STN mixture comprising | |
|---|---|
| CC-V-V1 | 29.00% |
| CCP-V-1 | 14.00% |
| CCP-V2-1 | 15.00% |
| CPP-1V2-2 | 5.00% |

EXAMPLE 5

| An STM mixture comprising | | | |
|---|---|---|---|
| PCH-3 | 15.00% | Clearing point: | 94° C |
| K6 | 8.00% | $\Delta n$: | 0.1254 |
| ME2N.F | 3.00% | $n_o$: | 1.4958 |
| ME3N.F | 2.00% | Twist: | 240° |
| ME4N.F | 4.00% | $V_{10}$: | 2.26 V |
| CC-2V-V2 | 30.00% | $V_{90}/V_{10}$: | 1.051 |
| CCP-V-1 | 15.00% | Response time: | 230 ms |
| CCP-V2-1 | 14.00% | | |
| CPP-1V2-2 | 5.00% | | |
| CPTP-302 | 4.00% | | |

EXAMPLE 6

| An STN mixture comprising | | | |
|---|---|---|---|
| PCH-3 | 12.00% | Clearing point: | 95.5° C |
| K6 | 10.00% | $\Delta n$: | 0.1259 |
| ME2N.F | 3.00% | $n_o$: | 1.4991 |
| ME3N.F | 2.00% | Twist: | 240° |
| ME4N.F | 4.00% | $V_{10}$: | 2.28 V |
| CBC-33 | 4.00% | $V_{90}/V_{10}$: | 1.025 |
| CBC-33F | 4.00% | Response time: | 244 ms |
| CC-V-V1 | 29.00% | | |
| CCP-V-1 | 12.00% | | |
| CCP-V2-1 | 15.00% | | |
| CCP-1V2-2 | 4.00% | | |

EXAMPLE 7

| An STN mixture comprising | | | |
|---|---|---|---|
| PCH-3 | 13.00% | Clearing point: | 108.5° C |
| K6 | 7.00% | $\Delta n$: | 0.1258 |
| ME2N.F | 3.00% | $n_o$: | 1.4991 |
| ME3N.F | 2.00% | Twist: | 240° |
| ME4N.F | 4.00% | $V_{10}$: | 2.35 V |
| CBC-33 | 4.00% | $V_{90}/V_{10}$: | 1.038 |
| CBC-33F | 4.00% | Response time: | 294 ms |
| CC-V2-V2 | 20.00% | | |
| CCP-V-1 | 14.00% | | |
| CCP-V2-1 | 15.00% | | |
| CPP-1V2-2 | 5.00% | | |
| CCG-V-F | 9.00% | | |

EXAMPLE 8

| An STN mixture comprising | | | |
|---|---|---|---|
| PCH-3 | 11.00% | Clearing point: | 100° C |
| K6 | 9.00% | $\Delta n$: | 0.1287 |
| ME2N.F | 3.00% | $n_o$: | 1.5006 |
| ME3N.F | 2.00% | Twist: | 240° |
| ME4N.F | 4.00% | $V_{10}$: | 2.31 V |
| CBC-33 | 3.00% | $V_{90}/V_{10}$: | 1.029 |
| CBC-33F | 3.00% | Response time: | 245 ms |
| CC-V-V1 | 20.00% | | |
| CCP-V-1 | 15.00% | | |
| CCP-V2-1 | 16.00% | | |
| CPP-1V2-2 | 10.00% | | |
| CC-5-V | 4.00% | | |

EXAMPLE 9

| An STN mixture comprising | | | |
|---|---|---|---|
| PCH-3 | 11.00% | Clearing point: | 99° C |
| K6 | 9.00% | $\Delta n$: | 0.1267 |
| ME2N.F | 3.00% | $n_o$: | 1.5005 |
| ME3N.F | 2.00% | Twist: | 240° |
| ME4N.F | 4.00% | $V_{10}$: | 2.29 V |
| CBC-33 | 3.00% | $V_{90}/V_{10}$: | 1.042 |
| CBC-33F | 3.00% | Response time: | 254 ms |
| CC-2V-V2 | 10.00% | | |
| CC-V-V | 10.00% | | |
| CCP-V-1 | 15.00% | | |
| CCP-V2-1 | 16.00% | | |
| CPP-1V2-2 | 10.00% | | |
| CC-5-V | 4.00% | | |

EXAMPLE 10

| An STN mixture comprising | | | |
|---|---|---|---|
| PCH-3 | 11.00% | Clearing point: | 101° C |
| K6 | 9.00% | $\Delta n$: | 0.1303 |
| ME2N.F | 3.00% | $n_o$: | 1.5001 |
| ME3N.F | 2.00% | Twist: | 240° |
| ME4N.F | 4.00% | $V_{10}$: | 2.38 V |
| CBC-33 | 3.00% | $V_{90}/V_{10}$: | 1.035 |
| CBC-33F | 3.00% | Response time: | 230 ms |
| CC-1V-V1 | 10.00% | | |
| CC-V-V | 10.00% | | |
| CCP-V-1 | 15.00% | | |
| CCP-V2-1 | 16.00% | | |
| CPP-1V2-2 | 10.00% | | |
| CC-5-V | 4.00% | | |

EXAMPLE 11

| An STN mixture comprising | | | |
|---|---|---|---|
| PCH-3 | 10.00% | Clearing point: | 101° C |
| K6 | 8.00% | $\Delta n$: | 0.1306 |
| ME2N.F | 4.00% | $n_o$: | 1.4994 |
| ME3N.F | 2.00% | Twist: | 240° |
| ME4N.F | 4.00% | $V_{10}$: | 2.28 V |
| CBC-33 | 3.00% | $V_{90}/V_{10}$: | 1.034 |
| CBC-33F | 4.00% | Response time: | 230 ms |
| CC-2V-V2 | 10.00% | | |

-continued

| An STN mixture comprising | |
|---|---|
| CC-V-V | 16.00% |
| CCP-V-1 | 15.00% |
| CCP-V2-1 | 16.00% |
| CPTP-303 | 4.00% |
| CPTP-302 | 4.00% |

EXAMPLE 12

| An STN mixture comprising | | | |
|---|---|---|---|
| PCH-3 | 10.00% | Clearing point: | 96° C |
| K6 | 10.00% | $\Delta n$: | 0.1381 |
| ME2N.F | 4.00% | $n_o$: | 1.5015 |
| ME3N.F | 2.00% | Twist: | 240° |
| ME4N.F | 4.00% | $V_{10}$: | 2.17 V |
| CBC-33 | 3.00% | $V_{90}/V_{10}$: | 1.044 |
| CBC-33F | 4.00% | Response time: | 195 ms |
| CC-2V-V2 | 10.00% | | |
| CC-V-V | 13.00% | | |
| CCP-V-1 | 15.00% | | |
| CCP-V2-1 | 16.00% | | |
| CPTP-303 | 5.00% | | |
| PTP-102 | 4.00% | | |

EXAMPLE 13

| An STN mixture comprising | | | |
|---|---|---|---|
| PCH-3 | 10.00% | Clearing point: | 102° C |
| K6 | 7.50% | $\Delta n$: | 0.1315 |
| ME2N.F | 4.00% | $n_o$: | 1.4985 |
| ME3N.F | 2.00% | Twist: | 240° C |
| ME4N.F | 4.00% | $V_{10}$: | 2.37 V |
| CBC-33 | 3.00% | $V_{90}/V_{10}$: | 1.028 |
| CBC-33F | 3.50% | Response time: | 235 ms |
| CC-1V-V1 | 10.00% | | |
| CC-V-V | 17.00% | | |
| CCP-V-1 | 15.00% | | |
| CCP-V2-1 | 16.00% | | |
| CPTP-303 | 4.00% | | |
| CPTP-302 | 4.00% | | |

EXAMPLE 14

| An STN mixture comprising | | | |
|---|---|---|---|
| PCH-3 | 11.00% | Clearing point: | 99° C |
| K6 | 10.00% | $\Delta n$: | 0.1408 |
| ME2N.F | 4.00% | $n_o$: | 1.5016 |
| ME3N.F | 2.00% | Twist: | 240° |
| ME4N.F | 3.00% | $V_{10}$: | 2.30 V |
| CBC-33 | 4.00% | $V_{90}/V_{10}$: | 1.033 |
| CBC-33F | 3.00% | Response time: | 197 ms |
| CC-1V-V1 | 10.00% | | |
| CC-V-V | 13.00% | | |
| CCP-V-1 | 15.00% | | |
| CCP-V2-1 | 16.00% | | |
| CPTP-303 | 5.00% | | |
| PTP-102 | 4.00% | | |

EXAMPLE 15

| An STN mixture comprising | | | |
|---|---|---|---|
| PCH-3 | 15.00% | Clearing point: | 99° C |
| ME2N.F | 2.00% | $\Delta n$: | 0.1449 |
| ME3N.F | 3.00% | Twist: | 240° |
| ME4N.F | 7.00% | $V_{10}$: | 2.29 V |
| CC-5-V | 12.00% | $V_{90}/V_{10}$: | 1.041 |
| CC-1V-V1 | 10.00% | Response time: | 203 ms |
| CCP-V-1 | 15.00% | | |
| CCP-V2-1 | 16.00% | | |
| PTP-102 | 5.00% | | |
| PTP-201 | 5.00% | | |
| CPTP-301 | 5.00% | | |
| CPTP-303 | 5.00% | | |

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A liquid-crystal display comprising:

two outer plates which, together with a frame, form a cell, a nematic liquid-crystal mixture of positive dielectric anisotropy which is present in the cell, electrode layers with alignment layers on the insides of the outer plates, a pretilt angle between the longitudinal axis of the molecules at the surface of the outer plates and the outer plates of 0–30 degrees, and a twist angle of said liquid-crystal mixture in the cell from alignment layer to alignment layer with a value of 22.5°–600°;

wherein said nematic liquid-crystal mixture comprises:

a) 20–90% by weight of a liquid-crystalline component A of one or more compounds having a dielectric anisotropy of greater than +1.5;

b) 10–65% by weight of a liquid-crystalline component B of one or more compounds having a dielectric anisotropy of −1.5–+1.5;

c) 0–20% by weight of a liquid-crystalline component C of one or more compounds having a dielectric anisotropy of below −1.5, and d) optionally an optically active component D in an amount whereby the ratio between the separation of the outer plates and the natural pitch of the resultant chiral nematic liquid-crystal mixture is 0.2–1.3;

wherein component A comprises at least one compound of formula IA

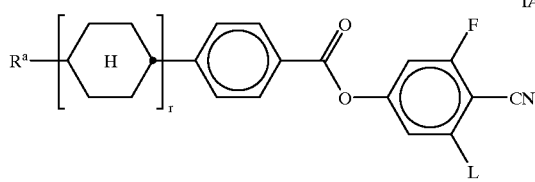

in which

R$^a$ is an alkyl group having 1 to 12 carbon atoms, in which, in addition, one or two non-adjacent CH$_2$ groups may be replaced by —O—, —CH=CH—, —CO—, —OCO— or —COO—, L is H or F, and r is 0 or 1; and wherein component B comprises at least one compound of formula IB

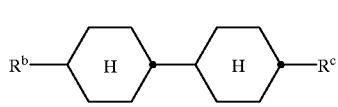

in which

R$^b$ and R$^c$ are each, independently of one another, an alkenyl group having, 2 to 7 carbon atoms.

2. A display according to claim 1, wherein component A further comprises one or more compounds of formulae II and III

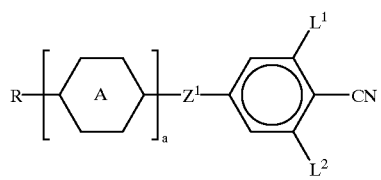

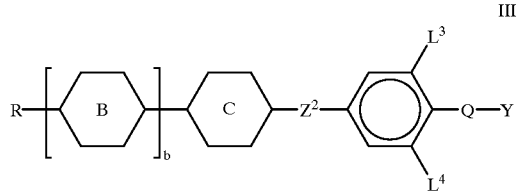

in which

R is an alkyl group having 1 to 12 carbon atoms, in which, in addition, one or two non-adjacent CH$_2$ groups may be replaced by —O—, —CH=CH—, —CO—, —OCO— or —COO—,

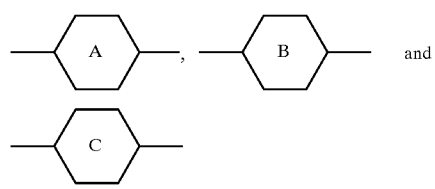

are each, independently of one another,

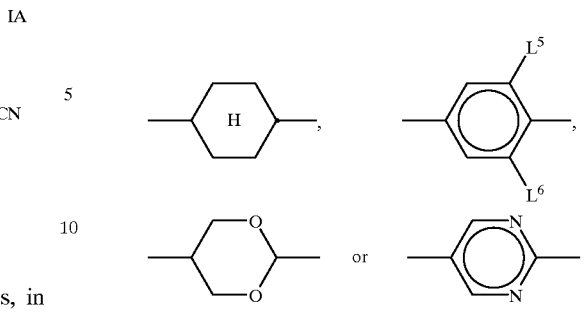

L$^{1-6}$ are each, independently of one another, H or F,

Z$^1$ is —COO—, —CH$_2$CH$_2$— or a single bond,

Z$^2$ is —CH$_2$CH$_2$—, —COO—, —C≡C— or a single bond,

Q is —CF$_2$—, —CHF—, —OCF$_2$—, —OCHF— or a single bond,

Y is F or Cl a is 1 or 2, and b is 0 or 1.

3. A display according to claim 1, wherein component A further comprises at least one compound of formulae IIa to IId

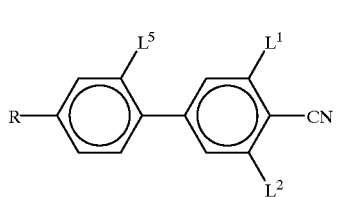

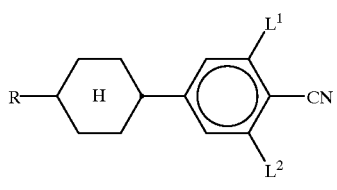

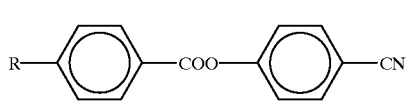

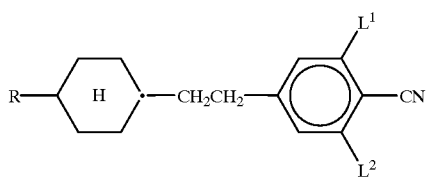

wherein R is an alkyl group having 1 to 12 carbon atoms, in which, in addition, one or two non-adjacent CH$_2$ groups may be replaced by —O—, —CH=CH—, —CO—, —OCO— or —COO—, L$^1$ is H or F, L$^2$ is H or F, and L$^5$ is H or F.

4. A display according to claim 1, wherein component B further comprises one or more compounds of formulae IV1 to IV24:

IV1 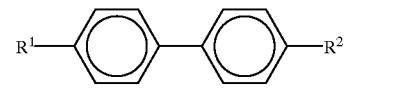
IV2 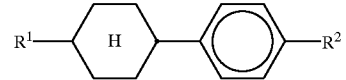
IV3 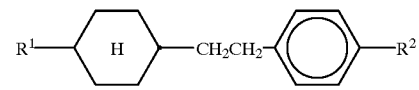
IV4 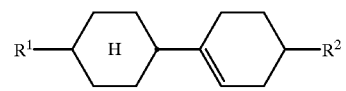
IV5 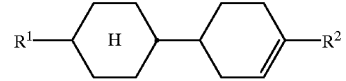
IV6 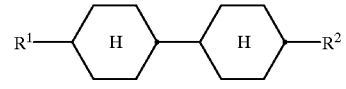
IV7 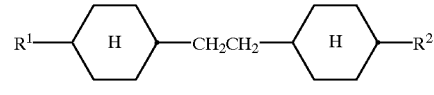
IV8 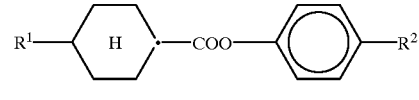
IV9 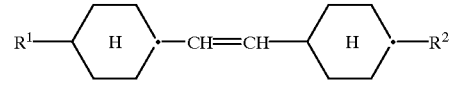
IV10 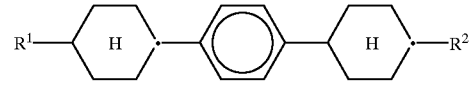
IV11 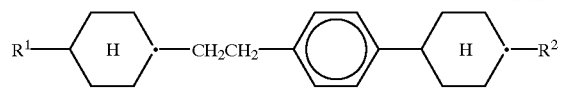
IV12 
IV13 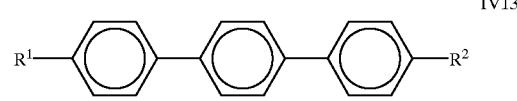
IV14 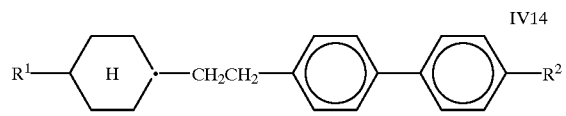

-continued

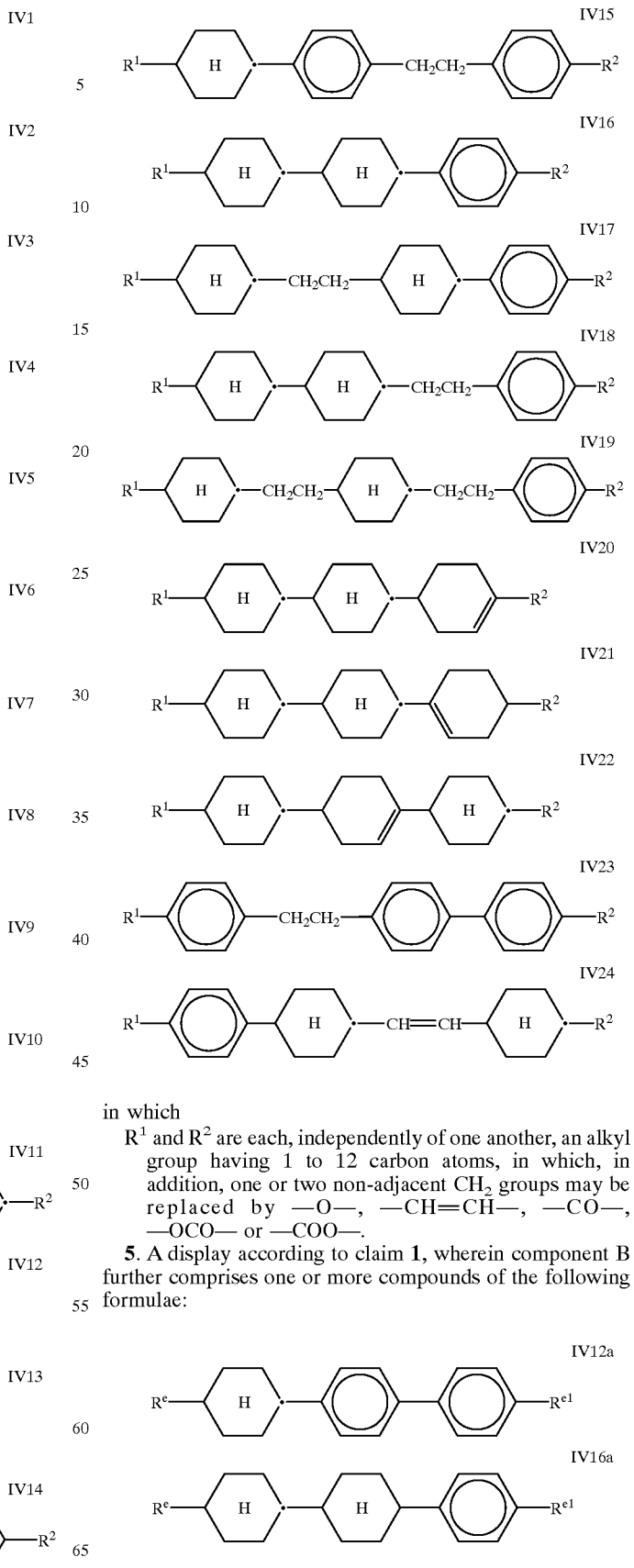

in which $R^1$ and $R^2$ are each, independently of one another, an alkyl group having 1 to 12 carbon atoms, in which, in addition, one or two non-adjacent $CH_2$ groups may be replaced by —O—, —CH=CH—, —CO—, —OCO— or —COO—.

5. A display according to claim 1, wherein component B further comprises one or more compounds of the following formulae:

IV12a 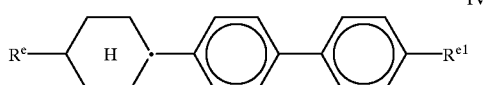

IV16a 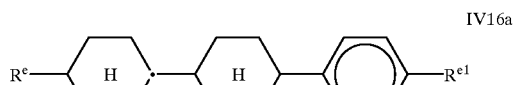

in which $R^e$ is an alkenyl group having 2 to 7 carbon atoms, and
$R^{e1}$ is straight-chain alkyl having 1 to 4 carbon atoms.

6. A display according to claim 1, wherein component C comprises one or more compounds of formulae V to IX

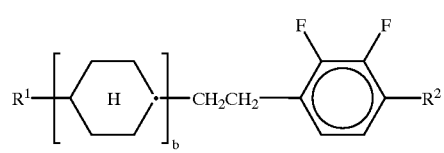
V

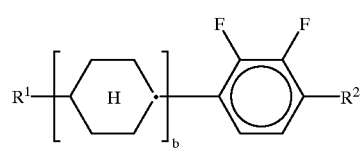
VI

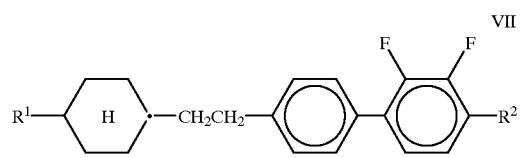
VII

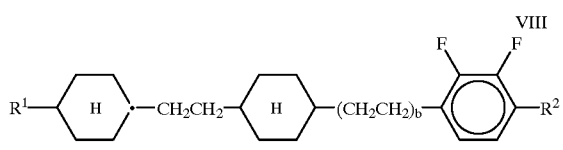
VIII

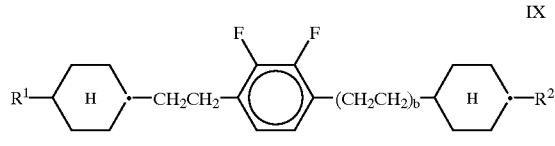
IX in which $R^1$ and $R^2$ are each, independently of one another, an alkyl group having 1 to 12 carbon atoms, in which, in addition, one or two non-adjacent $CH_2$ groups may be replaced by —O—, —CH=CH—, —CO—, —OCO— or —COO—, and b is 0 or 1.

7. A display according to claim 1, wherein component B further comprises one or more compounds of formulae Xa to XIIIa:

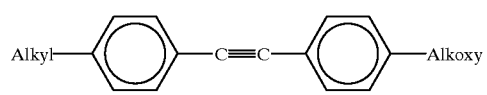
Xa

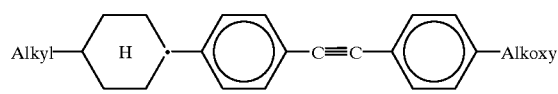
XIa

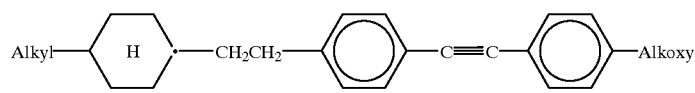
XIIa

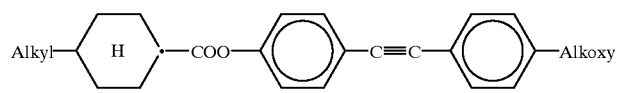
XIIIa in which Alkyl is a straight-chain alkyl having 1 to 7 carbon atoms and alkoxy is an alkoxy having 1 to 7 carbon atoms.

8. A display according to claim 1, wherein component A further comprises one or more compounds of formula T3

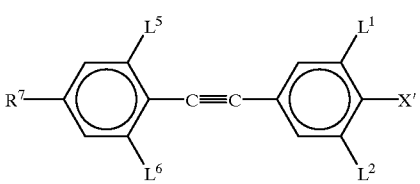
T3 in which $R^7$ is $-C_xH_{2x+1}$, $-OC_xH_{2x+1}$,

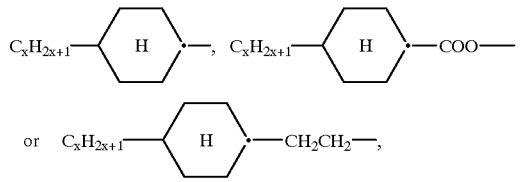

x is 1–15, $L^1$, $L^2$, $L^5$ and $L^6$ are each independently of one another, H or F, and X' is F, Cl or $OCF_3$.

9. A display according to claim 2, wherein R is a trans-alkenyl group having 2–7 carbon atoms.

10. A display according to claim 3, wherein R is a trans-alkenyl group having 2–7 carbon atoms.

11. A display according to claim 4, wherein at least one of $R^1$ and $R^2$ is a trans-alkenyl group having 2–7 carbon atoms.

12. A display according to claim 6, wherein at least one of $R^1$ and $R^2$ is a trans-alkenyl group having 2–7 carbon atoms.

13. A display according to claim 1, wherein Component C contains one or more compounds containing a 1-cyano-trans-1,4-cyclohexyl group or a 2,3-difluoro-1,4-phenylene group.

14. A display according to claim 2, wherein said mixture contains one or more compounds in which R is trans-alkenyl or trans-alkenyloxy.

15. A display according to claim 1, wherein said mixture comprises 3–6 compounds of formula IA and IB, and the amount of compounds of formulae IA and IB in said mixture is 10–60 wt. % based on the overall mixture.

16. A liquid-crystal mixture comprising:
   a) 20–90% by weight of a liquid-crystalline component A consisting of one or more compounds having a dielectric anisotropy of greater than +1.5;
   b) 10–65% by weight of a liquid-crystalline component B consisting of one or more compounds having a dielectric anisotropy of between −1.5 and +1.5; and
   c) 0–20% by weight of a liquid-crystalline component C consisting of one or more compounds having a dielectric anisotropy of below −1.5;

wherein component A comprises at least one compound of formula IA

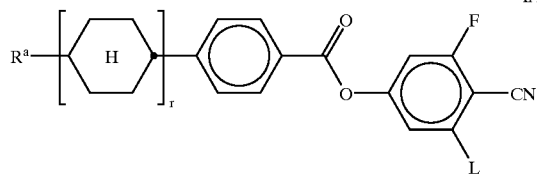

in which $R^4$ is an alkyl group having 1 to 12 carbon atoms, in which, in addition, one or two non-adjacent $CH_2$ groups may be replaced by —O—, —CH=CH—, —CO—, —OCO— or —COO—, L is H or F, and r is 0 or 1; and wherein component B comprises at least one compound of formula IB

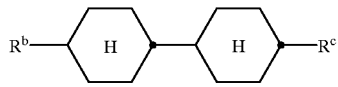

in which $R^b$ and $R^c$ are each, independently of one another, an alkenyl group having 2 to 7 carbon atoms.

17. A liquid crystal mixture according to claim 16, wherein said mixture further comprises an optically active component D in an amount whereby when said liquid crystal mixture is positioned between outer plates of a cell, the ratio between the separation of said outer plates and the natural pitch of the resultant chiral nematic liquid-crystal mixture is 0.2–1.3.

* * * * *